United States Patent
Lu

(10) Patent No.: US 9,985,895 B1
(45) Date of Patent: *May 29, 2018

(54) DECREMENTAL AUTOCORRELATION CALCULATION FOR STREAMED DATA USING COMPONENTS

(71) Applicant: Jizhu Lu, Redmond, WA (US)

(72) Inventor: Jizhu Lu, Redmond, WA (US)

(73) Assignee: CLOUD & STREAM GEARS LLC, Redmond, WA (US)

(\*) Notice: Subject to any disclaimer, the term of this patent is extended or adjusted under 35 U.S.C. 154(b) by 159 days.

This patent is subject to a terminal disclaimer.

(21) Appl. No.: 14/963,234

(22) Filed: Dec. 8, 2015

Related U.S. Application Data

(60) Provisional application No. 62/089,227, filed on Dec. 8, 2014.

(51) Int. Cl.
- *G06F 15/16* (2006.01)
- *H04L 12/813* (2013.01)
- *G06F 17/30* (2006.01)
- *H04L 29/08* (2006.01)

(52) U.S. Cl.
CPC ........ *H04L 47/20* (2013.01); *G06F 17/30876* (2013.01); *H04L 67/32* (2013.01)

(58) Field of Classification Search
None
See application file for complete search history.

(56) References Cited

U.S. PATENT DOCUMENTS

| 7,747,413 | B2 | 6/2010 | Ramsey et al. |
| 7,840,377 | B2 | 11/2010 | Ramsey et al. |
| 9,069,726 | B2 | 6/2015 | Lu |
| 2011/0302112 | A1* | 12/2011 | Shan ............ G06Q 10/067 706/12 |
| 2014/0164456 | A1 | 6/2014 | Lu |

FOREIGN PATENT DOCUMENTS

| WO | WO-2014093540 A2 | 6/2014 |
| WO | WO-2014093540 A3 | 9/2014 |

\* cited by examiner

*Primary Examiner* — Kenny S Lin

(57) ABSTRACT

The present invention extends to methods, systems, and computing system program products for decrementally calculating autocorrelation for streamed data in real time. Embodiments of the invention include decrementally calculating one or more components of autocorrelation at a specified lag in an adjusted computation window based on the one or more components of an autocorrelation at a specified lag calculated for a previous computation window and then calculating the autocorrelation at the specified lag for the adjusted computation window using the components. Decrementally calculating autocorrelation avoids visiting all data elements in the adjusted computation window and performing redundant computations thereby increasing calculation efficiency, saving computing resources and reducing computing system's power consumption.

18 Claims, 27 Drawing Sheets

The Definition of Autocorrelation:

Streamed Big Data or Time Series Data   Computation Window

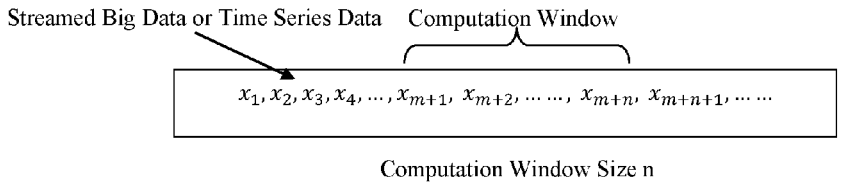

Computation Window Size n

Define the sum of the computation window $X$ with size $n$ in the $k^{th}$ iteration as below:

$$S_k = x_{m+1} + x_{m+2} + x_{m+3} + \cdots + x_{m+n} = \sum_{m+1}^{m+n} x_i \qquad 401$$

Define the mean of the computation window $X$ with size $n$ in the $k^{th}$ iteration as below:

$$\bar{x}_k = \frac{(x_{m+1}+x_{m+2}+x_{m+3}+\cdots+x_{m+n})}{n} = \frac{\sum_{m+1}^{m+n} x_i}{n} \qquad 402$$

Assume $l$ is the lag, then the autocorrelation for computation window $X$ with size $n$ is defined as $\rho_{(k,l)}$ where subscription $k$ denotes the order of iterations:

$$\rho_{(k,l)} = \frac{\sum_{m+1+l}^{m+n}(x_i-\bar{x}_k)(x_{i-l}-\bar{x}_k)}{\sum_{m+1}^{m+n}(x_i-\bar{x}_k)^2} \qquad 403$$

Now, suppose $\rho_{(k,l)}$ has already been calculated and the autocorrelation for computation window $X$ needs to be calculated again after an existing data element $x_r$ ($m + 1 \leq r \leq m + n$) has been removed from $X$.

Define the sum of the adjusted $X$ with size $n - 1$ in the k+1$^{th}$ iteration as below:

$$S_{k+1} = x_{m+1} + x_{m+2} + x_{m+3} + \cdots + x_{m+n} - x_r = \sum_{m+1}^{m+n} x_i - x_r \qquad 404$$

Define the mean of the adjusted $X$ with size $n - 1$ in the k+1$^{th}$ iteration as below:

$$\bar{x}_{k+1} = \frac{(x_{m+1}+x_{m+2}+x_{m+3}+\cdots+x_{m+n}-x_r)}{n-1} = \frac{\sum_{m+1}^{m+n} x_i - x_r}{n-1} \qquad 405$$

Define the autocorrelation of the adjusted $X$ with size $n - 1$ after removing the left most data element $x_r$ from the computation window in the k+1$^{th}$ iteration as ($r = m + 1$):

$$\rho^I_{(k+1,l)} = \frac{\sum_{m+1+l}^{m+n}(x_i-\bar{x}_{k+1})(x_{i-l}-\bar{x}_{k+1})-(x_r-\bar{x}_{k+1})(x_{r+l}-\bar{x}_{k+1})}{\sum_{m+1}^{m+n}(x_i-\bar{x}_{k+1})^2-(x_r-\bar{x}_{k+1})^2} \qquad 406$$

Define the autocorrelation of the adjusted $X$ with size $n - 1$ after removing the right most data element from the computation window in the k+1$^{th}$ iteration as ($r = m + n$):

$$\rho^{II}_{(k+1,l)} = \frac{\sum_{m+1+l}^{m+n}(x_i-\bar{x}_{k+1})(x_{i-l}-\bar{x}_{k+1})-(x_r-\bar{x}_{k+1})(x_{r-l}-\bar{x}_{k+1})}{\sum_{m+1}^{m+n}(x_i-\bar{x}_{k+1})^2-(x_r-\bar{x}_{k+1})^2} \qquad 407$$

Fig. 4A

Some Example Components of an Autocorrelation:

A component of an autocorrelation is a quantity or expression appearing in an autocorrelation's definition equation or any transforms of the definition equation. The following are a few example components of an autocorrelation.

- $S_k = \sum_1^n x_i$
- $\bar{x}_k = \frac{1}{n}\sum_1^n x_i$
- $SS_k = \sum_1^n x_i^2$
- $SX_k = \sum_1^n (x_i - \bar{x}_k)^2$
- $covX_{(k,l)} = \sum_{1+l}^n (x_i - \bar{x}_k)(x_{i-l} - \bar{x}_k)$     ($l$ is the lag)

Basic Decremental Component Calculation Equations:

The sum and/or mean of the data elements in the computation window will be used by following decremental algorithms, so the equations are put here instead of in each decremental algorithms.

$S_{k+1}$ defined in equation 404 can be calculated in a decremental way by using $S_k$ defined in equation 401:

$$S_{k+1} = S_k - x_r \qquad 408$$

$\bar{x}_{k+1}$ defined in equation 405 can be calculated in a decremental way by using $\bar{x}_k$ defined in equation 402:

$$\bar{x}_{k+1} = \frac{(n\bar{x}_k - x_r)}{n-1} \qquad 409$$

Fig. 4B

Decremental Algorithm 1:

$SS_k = \sum_{m+1}^{m+n} x_i^2$     410

$SS_{k+1} = \sum_{m+1}^{m+n} x_i^2 - x_r^2$     411

$SS_{k+1}$ can be calculated in a decremental way:

$SS_{k+1} = SS_k - x_r^2$     412

$SX_k = \sum_{m+1}^{m+n}(x_i - \bar{x}_k)^2$     413

$SX_{k+1} = \sum_{m+1}^{m+n}(x_i - \bar{x}_{k+1})^2 - (x_r - \bar{x}_{k+1})^2$     414

$SX_{k+1}$ can be calculated by using $SS_{k+1}$ calculated in equation 413 and $S_{k+1}$ or $\bar{x}_{k+1}$ defined in Figure 4A and Figure 4B:

$SX_{k+1} = SS_{k+1} - \bar{x}_{k+1}S_{k+1} = SS_{k+1} - S_{k+1}^2/(n-1) = SS_{k+1} - (n-1)\bar{x}_{k+1}^2$     415

$covX_{(k,l)} = \sum_{m+1+l}^{m+n}(x_i - \bar{x}_k)(x_{i-l} - \bar{x}_k)$     416

$covX^l_{(k+1,l)} = \sum_{m+1+l}^{m+n}(x_i - \bar{x}_{k+1})(x_{i-l} - \bar{x}_{k+1}) - (x_r - \bar{x}_{k+1})(x_{r+l} - \bar{x}_{k+1})$     417

$covX^l_{(k+1,l)}$ can be calculated in a decremental way using $S_k$ or $\bar{x}_k$ and $S_{k+1}$ or $\bar{x}_{k+1}$:

$covX^l_{(k+1,l)} = covX_{(k,l)} - (x_r - S_{k+1}/(n-1))(x_{r+l} - S_{k+1}/n) - (S_k/n - S_{k+1}/(n-1))\left(\sum_{m+2}^{m+l} x_i + \sum_{m+n+1-l}^{m+n} x_i + S_{k+1}/(n-1) - l(S_k/n + S_{k+1}/(n-1))\right) = covX_{(k,l)} - (x_r - \bar{x}_{k+1})(x_{r+l} - \bar{x}_{k+1}) - (\bar{x}_k - \bar{x}_{k+1})\left(\sum_{m+2}^{m+l} x_i + \sum_{m+n+1-l}^{m+n} x_i + \bar{x}_{k+1} - l(\bar{x}_k + \bar{x}_{k+1})\right)$     418

When removing the left most data element from the computation window, the autocorrelation defined in equation 406 at lag $l$ can be calculated by using $covX^l_{(k+1,l)}$ calculated in equation 418 and $SX_{k+1}$ calculated in equation 415

$\rho^l_{(k+1,l)} = \dfrac{covX^l_{(k+1,l)}}{SX_{k+1}}$     419

Fig. 4C

Decremental Algorithm 1 (cont'd):

$covX^{II}{}_{(k+1,l)} = \sum_{m+1+l}^{m+n}(x_i - \bar{x}_{k+1})(x_{i-l} - \bar{x}_{k+1}) - (x_r - \bar{x}_{k+1})(x_{r-l} - \bar{x}_{k+1})$ ⌒⌣420

$covX^{II}{}_{(k+1,l)}$ can be calculated in a decremental way using $S_k$ or $\bar{x}_k$ and $S_{k+1}$ or $\bar{x}_{k+1}$:

$covX^{II}{}_{(k+1,l)} = covX_{(k,l)} - (x_r - S_{k+1}/(n-1))(x_{r-l} - S_{k+1}/(n-1)) - (S_k/n - S_{k+1}/(n-1))\left(\sum_{m+2}^{m+l} x_i + \sum_{m+n+1-l}^{m+n} x_i + S_{k+1}/(n-1) - l(S_k/n + S_{k+1}/(n-1))\right) = covX_{(k,l)} - (x_r - \bar{x}_{k+1})(x_{r-l} - \bar{x}_{k+1}) - (\bar{x}_k - \bar{x}_{k+1})\left(\sum_{m+2}^{m+l} x_i + \sum_{m+n+1-l}^{m+n} x_i + \bar{x}_{k+1} - l(\bar{x}_k + \bar{x}_{k+1})\right)$

⌒⌣421

When removing the right most data element from the computation window, the autocorrelation defined in equation 407 at lag $l$ can be calculated by using $covX^{II}{}_{(k+1,l)}$ calculated in equation 421 and $SX_{k+1}$ calculated in equation 415

$\rho^{II}{}_{(k+1,l)} = \frac{covX^{II}{}_{(k+1,l)}}{SX_{k+1}}$ ⌒⌣422

Fig. 4C Cont'd

Decremental Algorithm 2:

$$SX_k = \sum_{m+1}^{m+n}(x_i - \bar{x}_k)^2 \qquad 423$$

$$SX_{k+1} = \sum_{m+1}^{m+n}(x_i - \bar{x}_{k+1})^2 - (x_r - \bar{x}_{k+1})^2 \qquad 424$$

$SX_{k+1}$ can be calculated in a decremental way using $S_k$ or $\bar{x}_k$ and $S_{k+1}$ or $\bar{x}_{k+1}$:

$$SX_{k+1} = SX_k - (x_r - S_{k+1}/(n-1))(x_r - S_k/n) = SX_k - (x_r - \bar{x}_{k+1})(x_r - \bar{x}_k) \qquad 425$$

$$covX_{(k,l)} = \sum_{m+1+l}^{m+n}(x_i - \bar{x}_k)(x_{i-l} - \bar{x}_k) \qquad 426$$

$$covX^I{}_{(k+1,l)} = \sum_{m+1+l}^{m+n}(x_i - \bar{x}_{k+1})(x_{i-l} - \bar{x}_{k+1}) - (x_r - \bar{x}_{k+1})(x_{r+l} - \bar{x}_{k+1}) \qquad 427$$

$covX^I{}_{(k+1,l)}$ can be calculated in a decremental way using $S_k$ or $\bar{x}_k$ and $S_{k+1}$ or $\bar{x}_{k+1}$:

$$covX^I{}_{(k+1,l)} = covX_{(k,l)} - (x_r - S_{k+1}/(n-1))(x_{r+l} - S_{k+1}/(n-1)) - (S_k/n - S_{k+1}/(n-1))\left(\sum_{m+2}^{m+l} x_i + \sum_{m+n+1-l}^{m+n} x_i + S_{k+1}/(n-1) - l(S_k/n + S_{k+1}/(n-1))\right) = covX_{(k,l)} - (x_r - \bar{x}_{k+1})(x_{r+l} - \bar{x}_{k+1}) - (\bar{x}_k - \bar{x}_{k+1})\left(\sum_{m+2}^{m+l} x_i + \sum_{m+n+1-l}^{m+n} x_i + \bar{x}_{k+1} - l(\bar{x}_k + \bar{x}_{k+1})\right)$$

$$428$$

When removing the left most data element from the computation window, the autocorrelation defined in equation 406 at lag $l$ can be calculated by using $covX^I{}_{(k+1,l)}$ calculated in equation 428 and $SX_{k+1}$ calculated in equation 425

$$\rho^I{}_{(k+1,l)} = \frac{covX^I{}_{(k+1,l)}}{SX_{k+1}} \qquad 429$$

$$covX^{II}{}_{(k+1,l)} = \sum_{m+1+l}^{m+n}(x_i - \bar{x}_{k+1})(x_{i-l} - \bar{x}_{k+1}) - (x_r - \bar{x}_{k+1})(x_{r-l} - \bar{x}_{k+1}) \qquad 430$$

$covX^{II}{}_{(k+1,l)}$ can be calculated in a decremental way using $S_k$ or $\bar{x}_k$ and $S_{k+1}$ or $\bar{x}_{k+1}$:

$$covX^{II}{}_{(k+1,l)} = covX_{(k,l)} - (x_r - S_{k+1}/(n-1))(x_{r-l} - S_{k+1}/(n-1)) - (S_k/n - S_{k+1}/(n-1))\left(\sum_{m+2}^{m+l} x_i + \sum_{m+n+1-l}^{m+n} x_i + S_{k+1}/(n-1) - l(S_k/n + S_{k+1}/(n-1))\right) = covX_{(k,l)} - (x_r - \bar{x}_{k+1})(x_{r-l} - \bar{x}_{k+1}) - (\bar{x}_k - \bar{x}_{k+1})\left(\sum_{m+2}^{m+l} x_i + \sum_{m+n+1-l}^{m+n} x_i + \bar{x}_{k+1} - l(\bar{x}_k + \bar{x}_{k+1})\right)$$

$$431$$

When removing the right most data element from the computation window, the autocorrelation defined in equation 407 at lag $l$ can be calculated by using $covX^{II}{}_{(k+1,l)}$ calculated in equation 431 and $SX_{k+1}$ calculated in equation 425

$$\rho^{II}{}_{(k+1,l)} = \frac{covX^{II}{}_{(k+1,l)}}{SX_{k+1}} \qquad 432$$

Fig. 4D

Decremental Algorithm 3:

$SX_k = \sum_{m+1}^{m+n}(x_i - \bar{x}_k)^2$ ⌒‿433

$SX_{k+1} = \sum_{m+1}^{m+n}(x_i - \bar{x}_{k+1})^2 - (x_r - \bar{x}_{k+1})^2$ ⌒‿434

$SX_{k+1}$ can be calculated in a decremental way using $S_k$ or $\bar{x}_k$ and $S_{k+1}$ or $\bar{x}_{k+1}$:

$SX_{k+1} = SX_k - (x_r - S_{k+1}/(n-1))(x_r - S_k/n) = SX_k - (x_r - \bar{x}_{k+1})(x_r - \bar{x}_k)$ ⌒‿435

$covX_{(k,l)} = \sum_{m+1+l}^{m+n}(x_i - \bar{x}_k)(x_{i-l} - \bar{x}_k)$ ⌒‿436

$covX^I_{(k+1,l)} = \sum_{m+1+l}^{m+n}(x_i - \bar{x}_{k+1})(x_{i-l} - \bar{x}_{k+1}) - (x_r - \bar{x}_{k+1})(x_{r+l} - \bar{x}_{k+1})$ ⌒‿437

$covX^I_{(k+1,l)}$ can be calculated in a decremental way using $S_k$ or $\bar{x}_k$ and $S_{k+1}$ or $\bar{x}_{k+1}$:

$covX^I_{(k+1,l)} = covX_{(k,l)} - (x_r - S_{k+1}/(n-1))(x_{r+l} - S_{k+1}/(n-1)) - (S_k/n - S_{k+1}/(n-1))(\sum_{m+1}^{m+l} x_i + \sum_{m+n+1-l}^{m+n} x_i + S_{k+1} - (n+l)S_k/n) = covX_{(k,l)} - (x_r - \bar{x}_{k+1})(x_{r+l} - \bar{x}_{k+1}) - (\bar{x}_k - \bar{x}_{k+1})(\sum_{m+1}^{m+l} x_i + \sum_{m+n+1-l}^{m+n} x_i + S_{k+1} - (n+l)\bar{x}_k) = covX_{(k,l)} - (x_r - \bar{x}_{k+1})(x_{r+l} - \bar{x}_{k+1}) - (\bar{x}_k - \bar{x}_{k+1})(\sum_{m+1}^{m+l} x_i + \sum_{m+n+1-l}^{m+n} x_i + (n-l)\bar{x}_{k+1} - (n+l)\bar{x}_k)$ ⌒‿438

When removing the left most data element from the computation window, the autocorrelation defined in equation 406 at lag $l$ can be calculated by using $covX^I_{(k+1,l)}$ calculated in equation 438 and $SX_{k+1}$ calculated in equation 435

$\rho^I_{(k+1,l)} = \frac{covX^I_{(k+1,l)}}{SX_{k+1}}$ ⌒‿439

$covX^{II}_{(k+1,l)} = \sum_{m+1+l}^{m+n}(x_i - \bar{x}_{k+1})(x_{i-l} - \bar{x}_{k+1}) - (x_r - \bar{x}_{k+1})(x_{r-l} - \bar{x}_{k+1})$ ⌒‿440

$covX^{II}_{(k+1,l)}$ can be calculated in a decremental way using $S_k$ or $\bar{x}_k$ and $S_{k+1}$ or $\bar{x}_{k+1}$:

$covX^{II}_{(k+1,l)} = covX_{(k,l)} - (x_r - S_{k+1}/(n-1))(x_{r-l} - S_{k+1}/(n-1)) - (S_k/n - S_{k+1}/(n-1))(\sum_{m+1}^{m+l} x_i + \sum_{m+n+1-l}^{m+n} x_i + S_{k+1} - (n+l)S_k/n) = covX_{(k,l)} - (x_r - \bar{x}_{k+1})(x_{r-l} - \bar{x}_{k+1}) - (\bar{x}_k - \bar{x}_{k+1})(\sum_{m+1}^{m+l} x_i + \sum_{m+n+1-l}^{m+n} x_i + S_{k+1} - (n+l)\bar{x}_k) = covX_{(k,l)} - (x_r - \bar{x}_{k+1})(x_{r-l} - \bar{x}_{k+1}) - (\bar{x}_k - \bar{x}_{k+1})(\sum_{m+1}^{m+l} x_i + \sum_{m+n+1-l}^{m+n} x_i + (n-l)\bar{x}_{k+1} - (n+l)\bar{x}_k)$ ⌒‿441

When removing the right most data element from the computation window, the autocorrelation defined in equation 405 at lag $l$ can be calculated by using $covX^{II}_{(k+1,l)}$ calculated in equation 441 and $SX_{k+1}$ calculated in equation 435

$\rho^{II}_{(k+1,l)} = \frac{covX^{II}_{(k+1,l)}}{SX_{k+1}}$ ⌒‿442

Fig. 4E

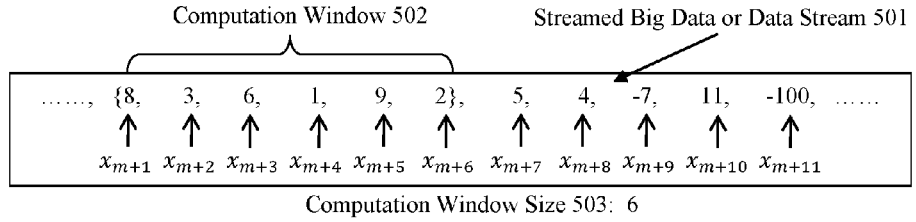

Computation Window Size 503: 6

Calculate Autocorrelation at lag 1 for Computation Window 502

1. Calculate $\bar{x}_1$ for the 1st iteration:

$$\bar{x}_1 = \frac{\sum_{m+1}^{m+6} x_i}{6} = \frac{8+3+6+1+9+2}{6} = \frac{29}{6} = 4.833333333333333$$

Operations in this step: 1 division, 5 additions

2. Calculate $\sum_{m+1}^{m+6}(x_i - \bar{x}_1)^2$ for the 1st iteration:

$$\sum_{m+1}^{m+6}(x_i - \bar{x}_1)^2 = \sum_{m+1}^{m+6}(x_i - 4.833333333333333)^2 = 54.83333333333333$$

Operations in this step: 6 multiplications, 5 additions, 6 subtractions

3. Calculate $\sum_{m+1+1}^{m+6}(x_i - \bar{x}_1)(x_{i-1} - \bar{x}_1)$ for the 1st iteration:

$$\sum_{m+1+1}^{m+6}(x_i - 4.833333333333333)(x_{i-1} - 4.833333333333333) = -40.19444444444445$$

Operations in this step: 5 multiplications, 4 additions, 10 subtractions

4. Calculate the autocorrelation $\rho_{(1,1)}$ at lag $l = 1$ for the 1st iteration:

$$\rho_{(1,1)} = \frac{\sum_{m+1+1}^{m+6}(x_i-\bar{x}_1)(x_{i-1}-\bar{x}_1)}{\sum_1^6(x_i-\bar{x}_1)^2} = \frac{-40.19444444444445}{54.83333333333333} = -0.7330293819655523$$

Operations in this step: 1 division

There are a total of 2 divisions, 11 multiplications, 14 additions and 16 subtractions when calculating the autocorrelation at lag = 1 on a computation window of size 6 without any optimization.

Fig. 5A

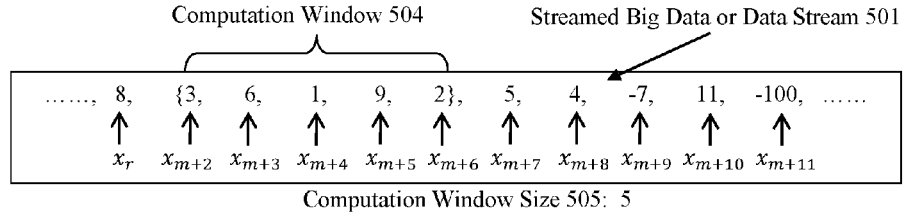

Computation Window Size 505: 5

Calculate Autocorrelation at lag 1 for Computation Window 504

1. Calculate $\bar{x}_2$ for the 2$^{nd}$ iteration:

$$\bar{x}_2 = \frac{\sum_{(m+1)+1}^{(m+1)+5} x_i}{5} = \frac{3+6+1+9+2}{5} = \frac{21}{5} = 4.2$$

Operations in this step: 1 division, 4 additions

2. Calculate $\sum_{(m+1)+1}^{(m+1)+5}(x_i - \bar{x}_2)^2$ for the 2$^{nd}$ iteration:

$\sum_{(m+1)+1}^{(m+1)+5}(x_i - \bar{x}_2)^2 = (3 - 4.2)^2 + (6 - 4.2)^2 + (1 - 4.2)^2 + (9 - 4.2)^2 + (2 - 4.2)^2 = 1.44 + 3.24 + 10.24 + 23.04 + 4.84 = 42.8$ Operations in this step: 5 multiplications, 4 additions, 5 subtractions 3. Calculate $\sum_{(m+1)+2}^{(m+1)+5}(x_i - \bar{x}_2)(x_{i-1} - \bar{x}_2)$ for the 2$^{nd}$ iteration:

$\sum_{(m+1)+2}^{(m+1)+5}(x_i - \bar{x}_2)(x_{i-1} - \bar{x}_2) = (6 - 4.2)(3 - 4.2) + (1 - 4.2)(6 - 4.2) + (9 - 4.2)(1 - 4.2) + (2 - 4.2)(9 - 4.2) = -2.16 - 5.76 - 15.36 - 10.56 = -33.84$ Operations in this step: 4 multiplications, 3 additions, 8 subtractions 4. Calculate the autocorrelation $\rho_{(2,1)}$ at lag $l = 1$ for the 2$^{nd}$ iteration:

$$\rho_{(2,1)} = \frac{\sum_{(m+1)+2}^{(m+1)+5}(x_i - \bar{x}_2)(x_{i-1} - \bar{x}_2)}{\sum_{(m+1)+1}^{(m+1)+5}(x_i - \bar{x}_2)^2} = \frac{-33.84}{42.8} = -0.7906542056074766$$

Operations in this step: 1 division

There are a total of 2 divisions, 9 multiplications, 11 additions and 13 subtractions when calculating the autocorrelation at lag $l = 1$ on a computation window of size 5 without any optimization.

Fig. 5A Cont'd 1

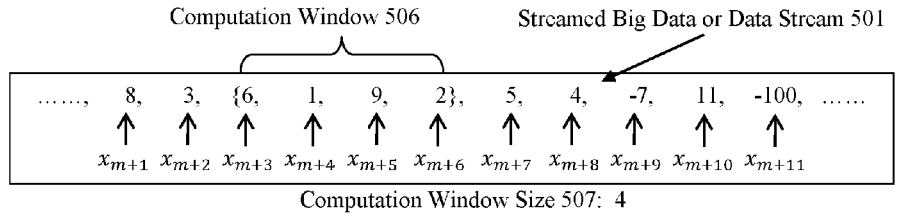

Computation Window Size 507: 4

Calculate Autocorrelation at lag 1 for Computation Window 506

1. Calculate $\bar{x}_3$ for the 3$^{rd}$ iteration:

$$\bar{x}_3 = \frac{\sum_{(m+2)+1}^{(m+2)+4} x_i}{4} = \frac{6+1+9+2}{4} = \frac{18}{4} = 4.5$$

Operations in this step: 1 division, 3 additions

2. Calculate $\sum_{(m+2)+1}^{(m+2)+4}(x_i - \bar{x}_3)^2$ for the 3$^{rd}$ iteration:

$\sum_{(m+2)+1}^{(m+2)+4}(x_i - \bar{x}_3)^2 = (6 - 4.5)^2 + (1 - 4.5)^2 + (9 - 4.5)^2 + (2 - 4.5)^2 = 2.25 + 12.25 + 20.25 + 6.25 = 41$ Operations in this step: 4 multiplications, 3 additions, 4 subtractions 3. Calculate $\sum_{(m+2)+2}^{(m+2)+4}(x_i - \bar{x}_3)(x_{i-1} - \bar{x}_3)$ for the 3$^{rd}$ iteration at lag $l = 1$:

$\sum_{(m+2)+2}^{(m+2)+4}(x_i - \bar{x}_3)(x_{i-1} - \bar{x}_3) = (1 - 4.5)(6 - 4.5) + (9 - 4.5)(1 - 4.5) + (2 - 4.5)(9 - 4.5) = -5.25 - 15.75 - 11.25 = -32.25$ Operations in this step: 3 multiplications, 2 additions, 6 subtractions 4. Calculate the autocorrelation $\rho_{(3,1)}$ at lag $l = 1$ for the 3$^{rd}$ iteration:

$$\rho_{(3,1)} = \frac{\sum_{(m+2)+2}^{(m+2)+4}(x_i - \bar{x}_3)(x_{i-1} - \bar{x}_3)}{\sum_{(m+2)+1}^{(m+2)+4}(x_i - \bar{x}_3)^2} = \frac{-32.25}{41} = -0.7865853658536585$$

Operations in this step: 1 division

There are a total of 2 divisions, 7 multiplications, 8 additions and 10 subtractions when calculating the autocorrelation at lag $l = 1$ on a computation window of size 4 without any optimization.

Traditional algorithms for calculating autocorrelation on $n$ data elements at a given lag $l$ will typically take a total of 2 divisions, $2n - l$ multiplications, $3n - (l + 3)$ additions, and $3n - 2l$ subtractions without any optimization.

Fig. 5A Cont'd 2

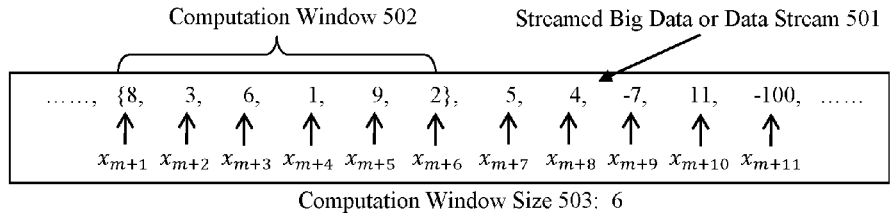

Computation Window Size 503: 6

Calculate Autocorrelation at lag 1 for Computation Window 502

Decremental Algorithm 1:

1. Calculate $\bar{x}_1$ for the 1st iteration:

$$\bar{x}_1 = \frac{\sum_{m+1}^{m+6} x_i}{6} = \frac{8+3+6+1+9+2}{6} = \frac{29}{6} = 4.8333333333333333$$

Operations in this step: 1 division, 5 additions

2. Use equation 410 to calculate $SS_1$ and equation 413 to calculate $SX_1$ $$SS_1 = \sum_{m+1}^{m+6} x_i^2 = 8^2 + 3^2 + 6^2 + 1^2 + 9^2 + 2^2 = 64 + 9 + 36 + 1 + 81 + 4 = 195$$

$$SX_1 = \sum_{m+1}^{m+6}(x_i - \bar{x}_1)^2 = \sum_{m+1}^{m+6}(x_i - 4.8333333333333333)^2 = 54.8333333333333333$$

Operations in this step: 8 multiplications, 5 additions, 6 subtractions

3. Calculate $covX_{(1,1)} = \sum_{m+1+1}^{m+6}(x_i - \bar{x}_1)(x_{i-1} - \bar{x}_1)$ for the 1st iteration:

$$\sum_{m+1+1}^{m+6}(x_i - 4.8333333333333333)(x_{i-1} - 4.8333333333333333) = -40.19444444444445$$

Operations in this step: 5 multiplications, 4 additions, 10 subtractions

4. Calculate the autocorrelation $\rho_{(1,1)}$ at lag $l - 1$ for the 1st iteration:

$$\rho_{(1,1)} = \frac{covX_{(1,1)}}{SX_1} = \frac{-40.19444444444445}{54.8333333333334} = -0.7330293819655514$$

Operations in this step: 1 division

There are a total of 2 divisions, 13 multiplications, 14 additions and 16 subtractions when calculating the autocorrelation at lag $l - 1$ on a computation window of size 6 without any optimization.

Fig. 5B

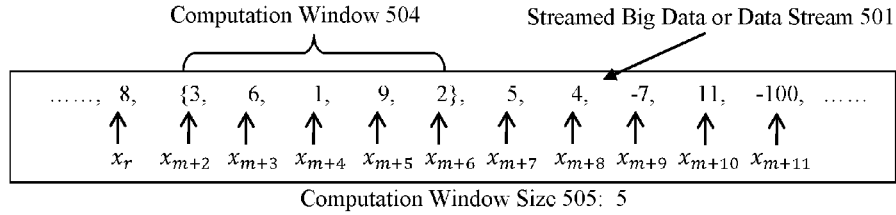

Computation Window Size 505: 5

Calculate Autocorrelation at lag 1 for Computation Window 504

Decremental Algorithm 1:

1. Use equation 409 to calculate $\bar{x}_2$ with n = 6 for the $2^{nd}$ iteration:

$$\bar{x}_2 = \frac{(6\bar{x}_1 - x_r)}{6-1} = \frac{6 \times 4.833333333333333 - 8}{5} = 4.2$$

Operations in this step: 1 division, 1 multiplication, 2 subtractions  (keep 6-1 value)

2. Use equation 412 to calculate $SS_2$ and equation 415 to calculate $SX_2$ for the $2^{nd}$ iteration:

$$SS_2 = SS_1 - x_r^2 = 195 - 8^2 = 131$$

$$SX_2 = SS_2 - (6-1)\bar{x}_2^2 = 131 - 5 \times 4.2^2 = 42.8$$

Operations in this step: 3 multiplications, 2 subtractions

3. Use equation 418 to calculate $covX^I{}_{(2,1)}$ at lag $l = 1$ for the $2^{nd}$ iteration:

$$covX^I{}_{(2,1)} = covX_{(1,1)} - (x_r - \bar{x}_2)(x_{r+1} - \bar{x}_2) - (\bar{x}_1 - \bar{x}_2)\left(\sum_{m+2}^{m+1} x_i + \sum_{m+6+1-1}^{m+6} x_i + \bar{x}_2 - 1 \times (\bar{x}_1 + \bar{x}_2)\right) = -40.19444444444445 - (8 - 4.2)(3 - 4.2) - (4.833333333333333 - 4.2)(2 - 4.833333333333333) = -33.84$$

Operation in this step: 3 multiplications, 3 additions, 6 subtractions

4. Use equation 419 to calculate the autocorrelation $\rho^I{}_{(2,1)}$ at lag $l = 1$ for the $2^{nd}$ iteration $$\rho^I{}_{(2,1)} = \frac{covX^I{}_{(2,1)}}{SX_2} = \frac{-33.84}{42.8} = -0.7906542056074766$$

Operations in this step: 1 division

There are a total of 2 divisions, 7 multiplications, 3 additions and 10 subtractions when decrementally calculating the autocorrelation at lag $l = 1$ on the computation window of size 5.

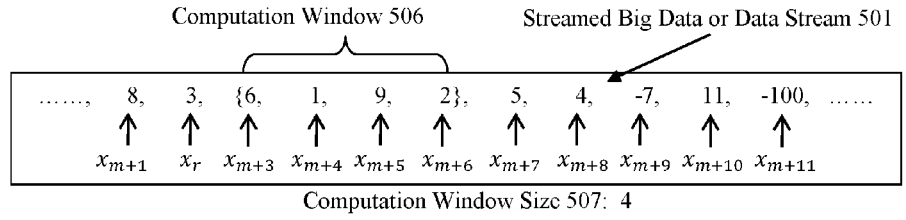

Computation Window Size 507: 4

Calculate Autocorrelation at lag 1 for Computation Window 506

Decremental Algorithm 1:

1. Use equation 409 to calculate $\bar{x}_3$ with n = 5 for the 3$^{rd}$ iteration:

$$\bar{x}_3 = \frac{(5\bar{x}_2 - x_r)}{5-1} = \frac{5 \times 4.2 - 3}{4} = 4.5$$

Operations in this step: 1 division, 1 multiplication, 2 subtractions  (keep 5-1 value)

2. Use equation 412 to calculate $SS_3$ and equation 415 to calculate $SX_3$ for the 3$^{rd}$ iteration:

$$SS_3 = SS_2 - x_r^2 = 131 - 3^2 = 122$$

$$SX_3 = SS_3 - (5-1)\bar{x}_3^2 = 122 - 4 \times 4.5^2 = 41$$

Operations in this step: 3 multiplications, 2 subtractions

3. Use equation 418 to calculate $covX^I{}_{(3,1)}$ at lag $l = 1$ and n = 5 for the 3$^{rd}$ iteration:

$$covX^I{}_{(3,1)} = covX^I{}_{(2,1)} - (x_r - \bar{x}_3)(x_{r+1} - \bar{x}_3) - (\bar{x}_2 - \bar{x}_3)\left(\sum_{(m+1)+2}^{(m+1)+1} x_i + \sum_{(m+1)+5+1-1}^{(m+1)+5} x_i + \bar{x}_3 - 1 \times (\bar{x}_2 + \bar{x}_3)\right) = -33.84 - (3 - 4.5)(6 - 4.5) - (4.2 - 4.5)(2 - 4.2) = -33.84 + 2.25 - 0.66 = -32.25$$

Operation in this step: 3 multiplications, 3 additions, 6 subtractions

4. Use equation 419 to calculate the autocorrelation $\rho^I{}_{(3,1)}$ for the 3$^{rd}$ iteration at lag $l = 1$:

$$\rho^I{}_{(3,1)} = \frac{covX^I{}_{(3,1)}}{SX_3} = \frac{-32.25}{41} = -0.7865853658536585$$

Operations in this step: 1 division

There are a total of 2 divisions, 7 multiplications, 3 additions and 10 subtractions when decrementally calculating the autocorrelation at lag $l = 1$ on the computation window of size 4.

Fig. 5B Cont'd 2

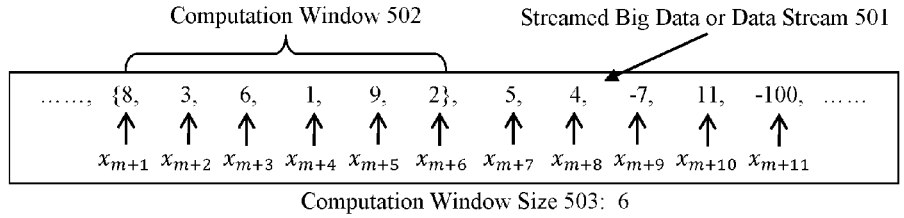

Computation Window Size 503: 6

Calculate Autocorrelation at lag 1 for Computation Window 502

Decremental Algorithm 2:

1. Calculate $\bar{x}_1$ for the 1st iteration:

$$\bar{x}_1 = \frac{\sum_{m+1}^{m+6} x_i}{6} = \frac{8+3+6+1+9+2}{6} = \frac{29}{6} = 4.8333333333333333$$

Operations in this step: 1 division, 5 additions

2. Use equation 423 to calculate $SX_1$ for the 1st iteration:

$SX_1 = \sum_{m+1}^{m+6}(x_i - \bar{x}_1)^2 = (8 - 4.8333333333333333\ )^2 + (3 - 4.8333333333333333\ )^2 + (6 - 4.8333333333333333\ )^2 + (1 - 4.8333333333333333\ )^2 + (9 - 4.8333333333333333\ )^2 + (2 - 4.8333333333333333\ )^2 = 54.8333333333333334$ Operations in this step: 6 multiplications, 5 additions, 6 subtractions 3. Use equation 426 to calculate $covX_{(1,1)}$ at lag $l = 1$ for the 1st iteration:

$covX_{(1,1)} = \sum_{m+1+1}^{m+6}(x_i - \bar{x}_1)(x_{i-1} - \bar{x}_1) = (3 - 4.8333333333333333)(8 - 4.8333333333333333) + (6 - 4.8333333333333333)(3 - 4.8333333333333333) + (1 - 4.8333333333333333)(6 - 4.8333333333333333) + (9 - 4.8333333333333333)(1 - 4.8333333333333333) + (2 - 4.8333333333333333)(9 - 4.8333333333333333) = -40.1944444444444445$ Operations in this step: 5 multiplications, 4 additions, 10 subtractions 4. Calculate the autocorrelation $\rho_{(1,1)}$ at lag $l = 1$ for the 1st iteration:

$$\rho_{(1,1)} = \frac{covX_{(1,1)}}{SX_1} = \frac{-40.19444444444445}{54.8333333333334} = -0.7330293819655514$$

Operations in this step: 1 division

There are a total of 2 divisions, 11 multiplications, 14 additions and 16 subtractions when calculating the autocorrelation at lag $l = 1$ on a computation window of size 6 without any optimization.

Fig. 5C

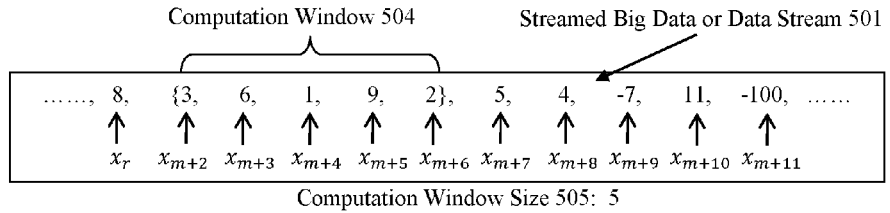

Computation Window Size 505: 5

Calculate Autocorrelation at lag 1 for Computation Window 504

Decremental Algorithm 2:

1. Use equation 409 to calculate $\bar{x}_2$ for the 2$^{nd}$ iteration:

$$\bar{x}_2 = \frac{(6\bar{x}_1 - x_r)}{6-1} = \frac{6 \times 4.833333333333333 - 8}{5} = 4.2$$

Operations in this step: 1 division, 1 multiplication, 2 subtractions

2. Use equation 425 to calculate $SX_2$ for the 2$^{nd}$ iteration:

$SX_2 = SX_1 - (x_r - \bar{x}_2)(x_r - \bar{x}_1) = 54.8333333333333334 - (8 - 4.2) \times (8 - 4.8333333333333333) = 42.8$ Operations in this step: 1 multiplication, 3 subtractions 3. Use equation 428 to calculate $covX^I{}_{(2,1)}$ at lag $l = 1$ for the 2$^{nd}$ iteration:

$covX^I{}_{(2,1)} = covX_{(1,1)} - (x_r - \bar{x}_2)(x_{r+1} - \bar{x}_2) - (\bar{x}_1 - \bar{x}_2)\left(\sum_{m+2}^{m+1} x_i + \sum_{m+6+1-1}^{m+6} x_i + \bar{x}_2 - 1 \times (\bar{x}_1 + \bar{x}_2)\right) = -40.194444444444445 - (8 - 4.2)(3 - 4.2) - (4.833333333333333 - 4.2)(2 - 4.833333333333333) = -33.84$ Operation in this step: 3 multiplications, 3 additions, 6 subtractions 4. Use equation 429 to calculate the autocorrelation $\rho^I{}_{(2,1)}$ at lag $l = 1$ for the 2$^{nd}$ iteration:

$$\rho^I{}_{(2,1)} = \frac{covX^I{}_{(2,1)}}{SX_2} = \frac{-33.84}{42.8} = -0.7906542056074766$$

Operations in this step: 1 division

There are a total of 2 divisions, 5 multiplications, 3 additions and 11 subtractions when decrementally calculating the autocorrelation at lag $l = 1$ on the computation window of size 5.

Fig. 5C Cont'd 1

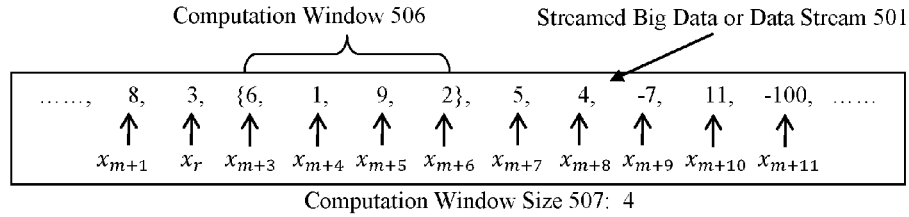

Computation Window Size 507: 4

Calculate Autocorrelation at lag 1 for Computation Window 506

Decremental Algorithm 2:

1. Use equation 409 to calculate $\bar{x}_3$ for the 3$^{rd}$ iteration:

$$\bar{x}_3 = \frac{(5\bar{x}_2 - x_r)}{5-1} = \frac{5 \times 4.2 - 3}{4} = 4.5$$

Operations in this step: 1 division, 1 multiplication, 2 subtractions

2. Use equation 425 to calculate $SX_3$ for the 3$^{rd}$ iteration:

$$SX_3 = SX_2 - (x_r - \bar{x}_3)(x_r - \bar{x}_2) = 42.8 - (3 - 4.5)(3 - 4.2) = 41$$

Operations in this step: 1 multiplication, 3 subtractions

3. Use equation 428 to calculate $covX^I{}_{(3,1)}$ at lag $l = 1$ for the 3$^{rd}$ iteration:

$$covX^I{}_{(3,1)} = covX^I{}_{(2,1)} - (x_r - \bar{x}_3)(x_{r+1} - \bar{x}_3) - (\bar{x}_2 - \bar{x}_3)\left(\sum_{(m+1)+2}^{(m+1)+1} x_i + \sum_{(m+1)+5+1-1}^{(m+1)+5} x_i + \bar{x}_3 - 1 \times (\bar{x}_2 + \bar{x}_3)\right) = -33.84 - (3 - 4.5)(6 - 4.5) - (4.2 - 4.5)(2 - 4.2) = -33.84 + 2.25 - 0.66 = -32.25$$

Operation in this step: 3 multiplications, 3 additions, 6 subtractions

4. Use equation 429 to calculate the autocorrelation $\rho^I{}_{(3,1)}$ for the 3$^{rd}$ iteration at lag $l = 1$:

$$\rho^I{}_{(3,1)} = \frac{covX^I{}_{(3,1)}}{SX_3} = \frac{-32.25}{41} = -0.7865853658536585$$

Operations in this step: 1 division

There are a total of 2 divisions, 5 multiplications, 3 additions and 11 subtractions when decrementally calculating the autocorrelation at lag $l = 1$ and lag $l = 2$ respectively on the computation window of size 4.

Fig. 5C Cont'd 2

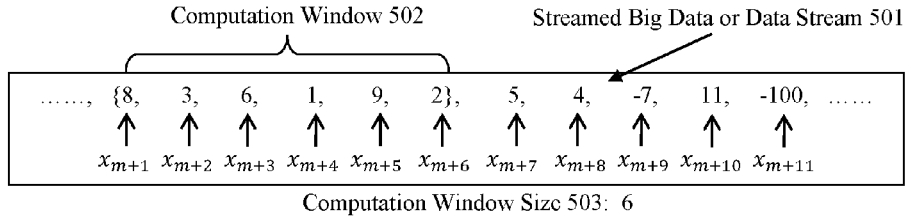

Computation Window Size 503: 6

Calculate Autocorrelation at lag 1 for Computation Window 502

Decremental Algorithm 3:

1. Calculate $\bar{x}_1$ for the 1st iteration:

$$\bar{x}_1 = \frac{\sum_{m+1}^{m+6} x_i}{6} = \frac{8+3+6+1+9+2}{6} = \frac{29}{6} = 4.8333333333333333$$

Operations in this step: 1 division, 5 additions

2. Use equation 433 to calculate $SX_1$ for the 1st iteration:

$SX_1 = \sum_{m+1}^{m+6}(x_i - \bar{x}_1)^2 = (8 - 4.8333333333333333\,)^2 + (3 - 4.8333333333333333\,)^2 + (6 - 4.8333333333333333\,)^2 + (1 - 4.8333333333333333\,)^2 + (9 - 4.8333333333333333\,)^2 + (2 - 4.8333333333333333\,)^2 = 54.8333333333333334$ Operations in this step: 6 multiplications, 5 additions, 6 subtractions 3. Use equation 436 to calculate $covX_{(1,1)}$ at lag $l = 1$ for the 1st iteration:

$covX_{(1,1)} = \sum_{m+1+1}^{m+6}(x_i - \bar{x}_1)(x_{i-l} - \bar{x}_1) = (3 - 4.8333333333333333)(8 - 4.8333333333333333) + (6 - 4.8333333333333333)(3 - 4.8333333333333333) + (1 - 4.8333333333333333)(6 - 4.8333333333333333) + (9 - 4.8333333333333333)(1 - 4.8333333333333333) + (2 - 4.8333333333333333)(9 - 4.8333333333333333) = -40.1944444444444445$ Operations in this step: 5 multiplications, 4 additions, 10 subtractions 4. Calculate the autocorrelation $\rho_{(1,1)}$ at lag $l = 1$ for the 1st iteration:

$$\rho_{(1,1)} = \frac{covX_{(1,1)}}{SX_1} = \frac{-40.1944444444444445}{54.8333333333333334} = -0.7330293819655514$$

Operations in this step: 1 division

There are a total of 2 divisions, 11 multiplications, 14 additions and 16 subtractions when calculating the autocorrelation at lag $l = 1$ on a computation window of size 6 without any optimization.

Fig. 5D

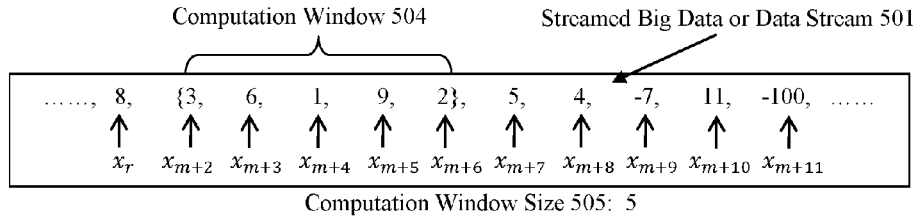

Computation Window Size 505: 5

Calculate Autocorrelation at lag 1 for Computation Window 504

Decremental Algorithm 3:

1. Use equation 409 to calculate $\bar{x}_2$ for the 2$^{nd}$ iteration:

$$\bar{x}_2 = \frac{(6\bar{x}_1 - x_r)}{6-1} = \frac{6 \times 4.8333333333333333 - 8}{5} = 4.2$$

Operations in this step: 1 division, 1 multiplication, 2 subtractions

2. Use equation 435 to calculate $SX_2$ for the 2$^{nd}$ iteration:

$SX_2 = SX_1 - (x_r - \bar{x}_2)(x_r - \bar{x}_1) = 54.8333333333333334 - (8 - 4.2) \times (8 - 4.8333333333333333) = 42.8$ Operations in this step: 1 multiplication, 3 subtractions 3. Use equation 438 to calculate $covX^I_{(2,1)}$ at lag $l = 1$ for the 2$^{nd}$ iteration:

$covX^I_{(2,1)} = covX_{(1,1)} - (x_r - \bar{x}_2)(x_{r+1} - \bar{x}_2) - (\bar{x}_1 - \bar{x}_2)(\sum_{m+1}^{m+1} x_i + \sum_{m+6+1-1}^{m+6} x_i + (6-1)\bar{x}_2 - (6+1)\bar{x}_1) = -40.19444444444445 - (8 - 4.2)(3 - 4.2) - (4.833333333333333 - 4.2)(8 + 2 + 5 \times 4.2 - 7 \times 4.833333333333333) = -40.19444444444445 + 4.56 + 1.794444444444444 = -33.84$ Operation in this step: 4 multiplications, 3 additions, 7 subtractions 4. Use equation 439 to calculate the autocorrelation $\rho^I_{(2,1)}$ at lag $l = 1$ for the 2$^{nd}$ iteration:

$$\rho^I_{(2,1)} = \frac{covX^I_{(2,1)}}{SX_2} = \frac{-33.84}{42.8} = -0.7906542056074766$$

Operations in this step: 1 division

There are a total of 2 divisions, 6 multiplications, 3 additions and 12 subtractions when decrementally calculating the autocorrelation at lag $l = 1$ on the computation window of size 5.

Fig. 5D Cont'd 1

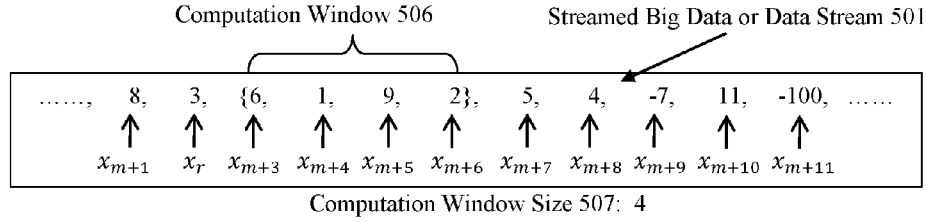

Computation Window Size 507: 4

Calculate Autocorrelation at lag 1 for Computation Window 506

Decremental Algorithm 3:

1. Use equation 409 to calculate $\bar{x}_3$ for the 3$^{rd}$ iteration:

$$\bar{x}_3 = \frac{(5\bar{x}_2 - x_r)}{5-1} = \frac{5 \times 4.2 - 3}{4} = 4.5$$

Operations in this step: 1 division, 1 multiplication, 2 subtractions

2. Use equation 435 to calculate $SX_3$ for the 3$^{rd}$ iteration:

$$SX_3 = SX_2 - (x_r - \bar{x}_3)(x_r - \bar{x}_2) = 42.8 - (3 - 4.5)(3 - 4.2) = 41$$

Operations in this step: 1 multiplication, 3 subtractions

3. Use equation 438 to calculate $covX^I{}_{(3,1)}$ at lag $l = 1$ for the 3$^{rd}$ iteration:

$covX^I{}_{(3,1)} = covX^I{}_{(2,1)} - (x_r - \bar{x}_3)(x_{r+1} - \bar{x}_3) - (\bar{x}_2 - \bar{x}_3)(\sum_{m+1}^{m+1} x_i + \sum_{m+5+1-1}^{m+5} x_i + (5-1)\bar{x}_3 - (5+1)\bar{x}_2) = -33.84 - (3 - 4.5)(6 - 4.5) - (4.2 - 4.5)(3 + 2 + 4 \times 4.5 - 6 \times 4.2) = -33.84 + 2.25 - 0.66 = -32.25$ Operation in this step: 4 multiplications, 3 additions, 7 subtractions 4. Use equation 439 to calculate the autocorrelation $\rho^I{}_{(3,1)}$ at lag $l = 1$ for the 3$^{rd}$ iteration:

$$\rho^I{}_{(3,1)} = \frac{covX^I{}_{(3,1)}}{SX_3} = \frac{-32.25}{41} = -0.7865853658536585$$

Operations in this step: 1 division

There are a total of 2 divisions, 6 multiplications, 3 additions and 12 subtractions when decrementally calculating the autocorrelation at lag $l = 1$ on the computation window of size 4.

Fig. 5D Cont'd 2

|  | Division | Multiplication | Addition | Subtraction |
|---|---|---|---|---|
| Traditional Algorithm | 2 | 7 | 8 | 10 |
| Decremental Algorithm 1 | 2 | 7 | 3 | 10 |
| Decremental Algorithm 2 | 2 | 5 | 3 | 11 |
| Decremental Algorithm 3 | 2 | 6 | 3 | 12 |

|  | Division | Multiplication | Addition | Subtraction |
|---|---|---|---|---|
| Traditional Algorithm | 2 | 1,999,999 | 2,999,996 | 2,999,998 |
| Decremental Algorithm 1 | 2 | 7 | 3 | 10 |
| Decremental Algorithm 2 | 2 | 5 | 3 | 11 |
| Decremental Algorithm 3 | 2 | 6 | 3 | 12 |

DECREMENTAL AUTOCORRELATION CALCULATION FOR STREAMED DATA USING COMPONENTS

CROSS-REFERENCE TO RELATED APPLICATIONS

This application claims the benefit of provisional patent application Ser. No. 62/089,227, filed 2014 Dec. 8 by the present inventor.

BACKGROUND AND RELEVANT ART

Internet, mobile communications, navigation, online gaming, sensing technologies and large scale computing infrastructures are producing large amounts of data every day. Big Data is data that is beyond the processing capacity of conventional database systems and analyzing capacity of traditional analyzing methods due to its large volume and fast moving and growing speed. More companies now rely on Big Data to make real-time decisions to solve various problems. Current methods involve utilizing a lot of computational resources, which are very costly, yet still may not satisfy the needs of real-time decision making based on the newest information, especially in the financial industry. How to efficiently, promptly and cost-effectively process and analyze Big Data presents a difficult challenge to data analysts and computer scientists.

Streamed data is data that is constantly being received by a receiver while being delivered by a provider. Streamed data may be real-time data gathered from sensors and continuously transferred to computing devices or electronic devices. Often this includes receiving similarly formatted data elements in succession separated by some time interval. Streamed data may also be data continuously read from storage devices, e.g., storage devices on multi-computing devices which store a Big Data set. Big Data sets are accumulated over time and they may be considered as a data stream with irregular time intervals, so algorithms on streamed data processing may be extended to Big Data processing. Stream processing has become a focused research area recently due to the following reasons. One reason is that the input data are coming too fast to store entirely for batch processing, so some analysis have to be performed when the data streams in. The second reason is that immediate responses to any changes of the data are required in some application domains, e.g., mobile related applications, online gaming, navigation, real-time stock analysis and automated trading, etc. The third reason is that some applications or electronic devices require streaming processing due to their nature, e.g., audio, video and digital TV, etc.

Processing Big Data or streamed data may include performing calculations on multiple data elements. When performing some statistical calculations on Big Data or streamed data, the number of data elements to be accessed could be quite large. For example, when calculating an autocorrelation a (potentially large) number of data elements may need to be accessed.

Further, some statistical calculations are recalculated as outdated data elements are removed from a Big Data set or a data stream. Thus, the (potentially large) number of data elements may need to be repeatedly accessed. For example, it may be that an autocorrelation is calculated for a computation window whose size n keeps decreasing to exclude the accessed or received data element from a Big Data set or a data stream. As such, every time a data element to be removed is accessed or received, the element is removed from the computation window. After a data element is removed from a computation window with a size n, n−1 data elements in the adjusted computation window are then accessed to recalculate the autocorrelation.

When performing an autocorrelation calculation at a given lag using traditional methods on n−1 data elements all the n−1 data elements in the computation window will be visited and used at least once.

Depending on necessity, the computation window size n could be extremely large, so the data elements in a computation window could be distributed over a cloud comprising hundreds of thousands of computing devices. Re-performing an autocorrelation calculation on Big Data sets after some data changing in traditional ways results in slow response and significant waste of computing resources.

BRIEF SUMMARY

The present disclosure describes methods, systems, and computing system program products for decrementally calculating autocorrelation for Big Data or streamed data. A computing system comprising computing devices includes one or more storage media. The one or more storage media comprises a data buffer for storing streamed data elements. The computing system maintains a computation window size counter which keeps tracking the size of a computation window of the data buffer. Decrementally calculating an autocorrelation at lag l for an adjusted computation window includes decrementally calculating one or more (p (p≥1)) components of an autocorrelation for the adjusted computation window based on one or more components of an autocorrelation at lag l for a previous computation window and then calculating the autocorrelation at lag l for the adjusted computation window as needed by using one or more decrementally calculated components at lag l. Decrementally calculating autocorrelation avoids visiting all data elements in the adjusted computation window and performing redundant computations thereby increasing calculation efficiency, saving computing resources and reducing computing system's power consumption.

The computing system decrementally calculates one or more components of an autocorrelation at a specified lag starting from a non-empty computation window where a computation window size counter and one or more components may have already been initialized. If not, the computation window size counter and one or more components of an autocorrelation at a specified lag may be initialized based on their definitions using the data elements in the computation window. A data element accessed or received by the computing system which will be removed from a computation window must be an existing data element in the computation window; else the computing results will not be correct.

The computing system initializes a computation window size counter n (n>1) and one or more components of an autocorrelation at a specified lag for a computation window of size n. The initialization of the computation window size counter comprises setting it's value with the number of data elements contained in a computation window or accessing or receiving a specified computation window size. The initialization of the one or more components comprises calculating the one or more components through their definitions by using the data elements in a computation window or accessing or receiving pre-calculated one or more components from one or more computing-device-readable media.

The computing system receives a data element or information about (e.g., index or address of) a data element to be removed from the computation window. The computing system removes the to-be-removed data element from the data buffer. The computing system adjusts the non-empty computation window by removing to-be-removed data element from the computation window. The computing system adjusts the computation window size by decreasing its value by 1. The computing system calculates one or more components at the specified lag using the data element accessed or received. An autocorrelation at the specified lag may be calculated using one or more components at the specified lag.

At a specified lag value l, the computing system directly decrementally calculates one or more (v ($1 \leq v \leq p$)) components of an autocorrelation at the given lag l for the adjusted computation window by using the v components at the given lag l for the previous computation window. Directly decrementally calculating the v components of an autocorrelation includes accessing l data elements from each side of the computation window respectively and the data element removed from the computation window and accessing each of the v components at the given lag calculated for the previous computation window. Directly decrementally calculating the v components of an autocorrelation includes removing any contribution of the data element removed from the computation window from each of the v components mathematically.

The computing system starts indirectly decrementally calculating w=p−v components at the given lag and calculating an autocorrelation at the given lag as needed by using one or more decrementally calculated components at the given lag.

At the given lag value, the computing system indirectly decrementally calculating w=p−v components as needed: indirectly decrementally calculating the w components includes indirectly decrementally calculating each of the w components one by one. Indirectly decrementally calculating a component includes accessing one or more directly decrementally calculated. Indirectly decrementally calculating a component includes calculating the component using components other than the component itself. The components used for calculating an indirectly decrementally calculated component could have been directly decrementally calculated, indirectly decrementally calculated or initialized.

The computing system generates an autocorrelation at the given lag as needed by using one or more decrementally calculated components at the given lag.

The computing system may keep accessing or receiving a data element to be removed, removing the data element from the data buffer, adjusting the computation window and the computation window size, directly decrementally calculating v ($1 \leq v \leq p$) components at the specified lag, indirectly decrementally calculating w=p−v components at the specified lag as needed and generating autocorrelation at the specified lag as needed, and the computing system may repeat this process for as many times as needed.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention may be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4A illustrates the definition of an autocorrelation and traditional equations for calculating an autocorrelation.

FIG. 4B illustrates some example components of an autocorrelation and basic decremental component calculation equations.

FIG. 4C illustrates the equations of the first example decremental autocorrelation calculation algorithm (decremental algorithm 1).

FIG. 4D illustrates the equations of the second example decremental autocorrelation calculation algorithm (decremental algorithm 2).

FIG. 4E illustrates the equations of the third example decremental autocorrelation calculation algorithm (decremental algorithm 3).

FIG. 5A illustrates an example of calculating autocorrelation using traditional algorithms as shown in FIG. 4A.

FIG. 5B illustrates an example of calculating autocorrelation using decremental algorithm 1 as shown in FIG. 4C.

FIG. 5C illustrates an example of calculating autocorrelation using decremental algorithm 2 as shown in FIG. 4D.

FIG. 5D illustrates an example of calculating autocorrelation using decremental algorithm 3 as shown in FIG. 4E.

FIG. 6 illustrates computational loads for traditional algorithms and decremental algorithms with a computation window of size 4.

FIG. 7 illustrates computational loads for traditional algorithms and decremental algorithms with a computation window of size 1,000,000.

DETAILED DESCRIPTION

Figure 1:
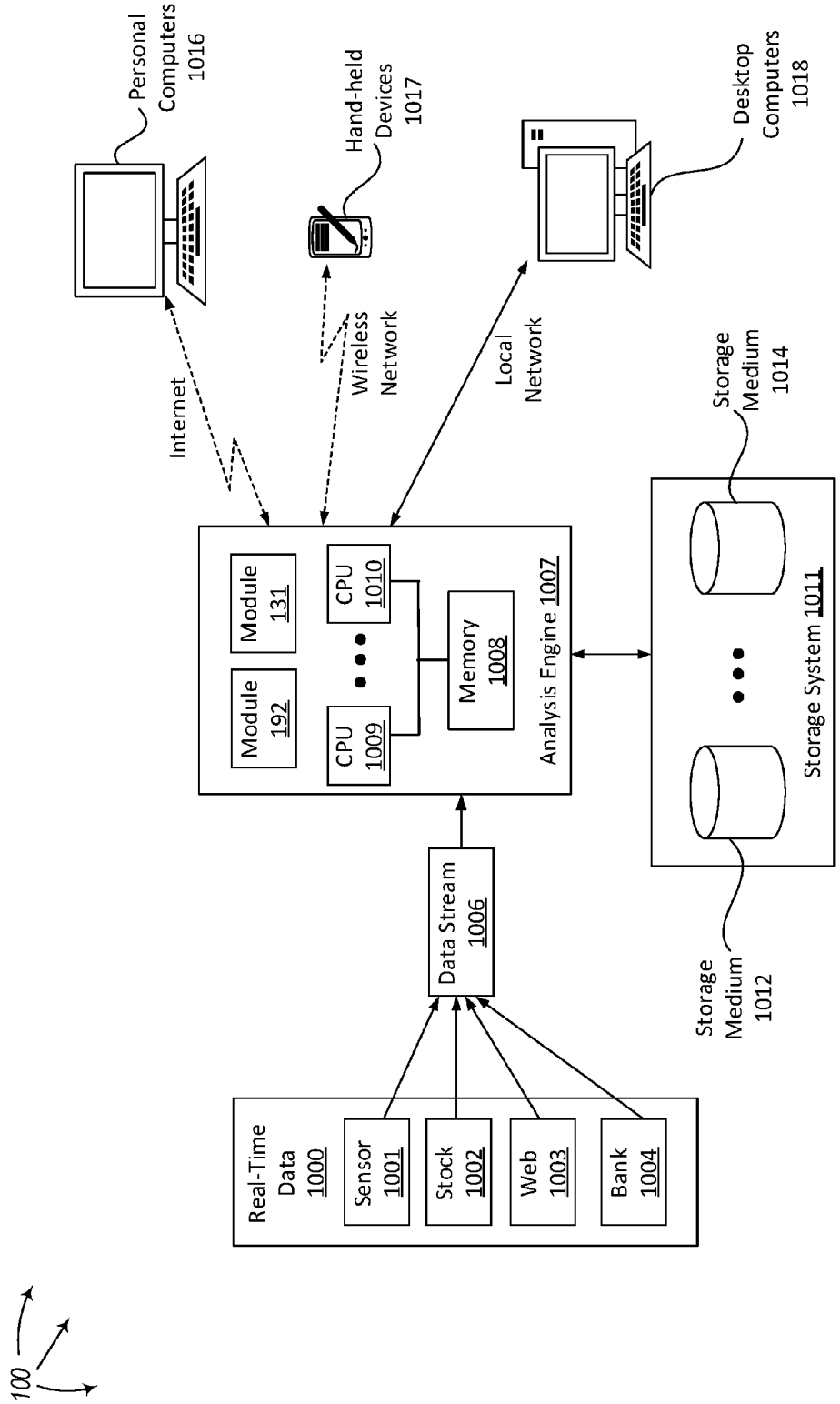
FIG. 1 illustrates a high-level overview of an example computing system that facilitates decrementally calculating autocorrelation for streamed data.

The present disclosure describes methods, systems, and computing system program products for decrementally calculating an autocorrelation at a specified lag (l ($1 \leq l \leq n$)) for streamed data in real time by decrementally calculating one or more (p ($p \geq 1$)) components of an autocorrelation at the specified lag l. Decrementally calculating autocorrelation avoids visiting all data elements needed by traditional methods, and effectively increases calculation efficiency, saves computing resources and reduces computing system's power consumption. A computing system comprises one or more processor-based computing devices and one or more storage media. The computing system includes a data buffer for storing streamed data elements. The computing system maintains a computation window size counter which indicates a specified number of data elements in a computation window of the data buffer. The buffer may reside in memory or other non-transitory computer-readable media, such as a hard disk or other media, and may include multiple distributed files on multiple distributed computing devices, such as may be connected end-to-end to form a "circular buffer". The computing system also includes a data buffer that have stored data elements in the computation window.

An autocorrelation is a measure of the correlation of a particular time series with the same time series delayed by l lags. It is also called "lagged correlation" or "serial correlation". It is obtained by dividing the covariance between two observations, separated by l lags, of a time series by the standard deviation. For a time series that does not change over time, the autocorrelation decreases exponentially to 0. The value of an autocorrelation is between −1 and +1. A value of 1 indicates there is a perfect positive linear relationship between the time series' past and future values. A value of −1 indicates there is an exact negative linear relationship between the time series' past and future values.

A computation window is a range of data elements which are involved in an autocorrelation calculation. The data elements in a computation window have orders, i.e., changing the relative positions of the data elements contained in a computation window may affect the computing results of an autocorrelation for the computation window.

As used herein, a component of an autocorrelation is a quantity or expression appearing in the autocorrelation's definition equation or any transforms of the definition equation. An autocorrelation is the largest component of an autocorrelation itself. An autocorrelation may be calculated using one or more components of autocorrelation.

A component may be either directly decrementally calculated or indirectly decrementally calculated. The difference between them is that when directly decrementally calculating a component the component is calculated by using the component's value in previous iteration but when indirectly decrementally calculating a component the component is calculated by using components other than the component itself.

For a given component, it might be directly decrementally calculated in one algorithm but indirectly decrementally calculated in another algorithm.

For a given algorithm, assume the total number of different components is p ($p \geq 1$), the number of directly decrementally calculated components is v ($1 \leq v \leq p$), then the number of indirectly decrementally calculated components is w=p−v ($0 \leq w < p$). For any algorithm, there will be at least one component being directly decrementally calculated. It is possible that all components are directly decrementally calculated (in this case v=p and w=0). However, directly decrementally calculated components must be calculated in every iteration no matter if an autocorrelation is accessed or not in a specific iteration.

For a given algorithm, if a component is directly decrementally calculated, then the component must be calculated in every iteration (i.e., whenever a data element is removed from the computation window). However, if a component is indirectly decrementally calculated, then the component may be calculated as needed using one or more components other than the component itself, i.e., only when an autocorrelation needs to be calculated and accessed. So, when an autocorrelation is not accessed in a specific iteration, only a small number of components are decrementally calculated to save computation time. It should be understood that an indirectly decrementally calculated component may also be used in the calculation of a directly decrementally calculated component. In that case, the indirectly decrementally calculated component should also be calculated in every iteration.

Embodiments of the invention include decrementally calculating each of the one or more components of autocorrelation at the specified lag in an adjusted computation window based on one or more components of autocorrelation at the specified lag calculated for a previous computation window.

The computing system decrementally calculates one or more components of an autocorrelation starting from a non-empty computation window where a computation window size counter and one or more components may have already been initialized. If not, the computation window size counter and one or more components may be initialized by using the data elements in the computation window. The initialization of the computation window size comprises setting its value with the number of data elements contained in the computation window or accessing or receiving a specified computation window size. The initialization of the one or more components comprises calculating the one or more components through their definitions by using the data elements in the computation window or accessing or receiving pre-calculated one or more components from one or more computing-device-readable media.

The computing system initialize one or more (v ($1 \leq v \leq p$, $p \geq 1$)) components of an autocorrelation at a specified lag l ($l \geq 1$) for data elements in a computation window of a specified size n (n>l).

The computing system accesses or receives a data element or information about (e.g., index or address of) a data element to be removed from the non-empty computation window. The computing system removes the accessed or received data element from a data buffer. The computing system removes the accessed or received data element from the computation window. The computing system adjusts the computation window size by decreasing its value by 1.

The computing system directly decrementally calculates one or more (v (1≤v≤p)) components of an autocorrelation at the given lag l for the adjusted computation window. Directly decrementally calculating the v components includes directly decrementally calculating each of the v components one by one. Directly decrementally calculating a component includes: accessing l data elements from each side of the computation window respectively and the data element removed from the computation window, accessing the v components calculated for the previous computation window and mathematically removing any contribution of the data element removed from the computation window from each of the v components.

The computing system indirectly decrementally calculates one or more (w (w=p−v)) components of an autocorrelation at the given lag for the adjusted computation window as needed and then generates the autocorrelation at the given lag for the adjusted computation window using one or more decrementally calculated components as needed, for example, only when the autocorrelation is accessed. Indirectly decrementally calculating the w components includes indirectly decrementally calculating each of the w components one by one. Indirectly decrementally calculating a component includes calculating the component using components other than the component itself (Depending on a specific algorithm used, calculating each of the w components may also need access and use the data element removed from the computation window). The computing system generates an autocorrelation at the given lag l for the adjusted computation window by using one or more decrementally calculated components.

The computing system may keep accessing or receiving a data element to be removed, removing the data element from a data buffer, adjusting the computation window and the computation window size, directly decrementally calculating v (1≤v≤p) components at the specified lag, storing directly decrementally calculated v components at the specified lag, indirectly decrementally calculating w=p−v components at the specified lag as needed and generating an autocorrelation the specified lag as needed, and the computing system may repeat this process for as many times as needed.

Embodiments of the present invention may comprise or utilize a special purpose or general-purpose computing device including computing device hardware, such as, for example, one or more processors and system memory, as discussed in greater detail below. Embodiments within the scope of the present invention also include physical and other computing-device-readable media for carrying or storing computing-device-executable instructions and/or data structures. Such computing-device-readable media may be any available media that may be accessed by a general purpose or special purpose computing device. Computing-device-readable media that store computing-device-executable instructions are computing device storage media (devices). Computing-device-readable media that carry computing-device-executable instructions are transmission media. Thus, by way of example, and not limitation, embodiments of the invention may comprise at least two distinctly different kinds of computing-device-readable media: computing device storage media (devices) and transmission media.

Computing device storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which may be used to store desired program code means in the form of computing-device-executable instructions or data structures and which may be accessed by a general purpose or special purpose computing device.

A "network" is defined as one or more data links that enable the transport of electronic data between computing devices and/or modules and/or other electronic devices. When information is transferred or provided over a network or another communications connection (either hardwired, wireless, or a combination of hardwired or wireless) to a computing device, the computing device properly views the connection as a transmission medium. Transmissions media may include a network and/or data links which may be used to carry desired program code means in the form of computing-device-executable instructions or data structures and which may be accessed by a general purpose or special purpose computing device. Combinations of the above should also be included within the scope of computing-device-readable media.

Further, upon reaching various computing device components, program code means in the form of computing-device-executable instructions or data structures may be transferred automatically from transmission media to computing device storage media (devices) (or vice versa). For example, computing-device-executable instructions or data structures received over a network or data link may be buffered in RAM within a network interface module (e.g., a "NIC"), and then eventually transferred to computing device RAM and/or to less volatile computing device storage media (devices) at a computing device. Thus, it should be understood that computing device storage media (devices) may be included in computing device components that also (or even primarily) utilize transmission media.

Computing-device-executable instructions comprise, for example, instructions and data which, when executed at a processor, cause a general purpose computing device or special purpose computing device to perform a certain function or group of functions. The computing device executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that embodiments of the present invention may be practiced in network computing environments with many types of computing device configurations, including, personal computers, desktop computers, laptop computers, message processors, hand-held devices, multi-processor systems, microprocessor-based or programmable consumer electronics, network PCs, mini-computers, mainframe computers, supercomputers, mobile telephones, PDAs, tablets, pagers, routers, switches, and the like. Embodiments of the present invention may also be practiced in distributed system environments where local and remote computing devices, which are linked (either by hardwired data links, wireless data links, or by a combination of hardwired and wireless data links) through a network, both perform tasks. In a distributed system environment, program modules may be located in both local and remote memory storage devices.

Embodiments of the invention may also be implemented in cloud computing environments. In this description and the following claims, "cloud computing" is defined as a model for enabling on-demand network access to a shared pool of configurable computing resources. For example, cloud computing may be employed in the marketplace to offer ubiquitous and convenient on-demand access to the shared pool of configurable computing resources. The shared pool of configurable computing resources may be rapidly provisioned via virtualization and released with low management effort or service provider interaction, and then scaled accordingly.

A cloud computing model may be composed of various characteristics such as, for example, on-demand self-service, broad network access, resource pooling, rapid elasticity, measured service, and so forth. A cloud computing model may also expose various service models, such as, for example, Software as a Service ("SaaS"), Platform as a Service ("PaaS"), and Infrastructure as a Service ("IaaS"). A cloud computing model may also be deployed using different deployment models such as private cloud, community cloud, public cloud, hybrid cloud, and so forth. In this description and in the claims, a "cloud computing environment" is an environment in which cloud computing is employed.

Within this description and the following claims, a "circular buffer" is a data structure that uses a single, fixed-size "buffer" as if it were connected end-to-end. A circular buffer may also be referred to as a cyclic buffer or a ring buffer. The "buffer" may be a commonly used circular buffer which is generally a space allocated in a local memory. The "buffer" may also be a "virtual circular buffer" which doesn't necessarily be in memory, and it could be a file on a hard disk or even multiple distributed files on distributed computing devices as long as those distributed files logically connected to form a "circular buffer". The detailed information regarding the "virtual circular buffer" may be found in another invention, "Virtual Circular Buffer", by Jizhu Lu.

FIG. 1 illustrates a high-level overview of an example computing system 100 that facilitates decrementally calculating autocorrelation for streamed data. Referring to FIG. 1, computing system 100 comprises multiple devices connected by different networks, such as local network, internet and wireless network, etc. The multiple devices include, for example, a data analysis engine 1007, a storage system 1011, live data stream 1006, and multiple distributed computing devices that may schedule data analysis tasks and/or query data analysis results, such as personal computer 1016, hand-held devices 1017 and desktop computer 1018, etc. Data analysis engine 1007 may comprise one or more processors, e.g., CPU 1009 and CPU 1010, one or more system memory, e.g., system memory 1008, and autocorrelation calculation module 192 and component calculation module 131. autocorrelation calculation module 192 and component calculation module 131 will be illustrated in more details in other figures. Storage system 1011 may comprise one or more storage media, e.g., storage medium 1012 and storage medium 1014, which may be used for hosting Big Data sets. Data sets on storage system 1011 may be accessed by data analysis engine 1007. In general, data stream 1006 may comprise streamed data from different data sources, for example, stock quotes, audio data, video data, geospatial data, web data, mobile communication data, online gaming data, banking transaction data, sensor data, closed-captioning data, etc. To depict a few, real-time data 1000 may comprise data collected from sensor 1001, stock 1002, web 1003 and bank 1004, etc. in real-time. Data analysis engine 1007 may receive data elements from data stream 1006. It should be understood that FIG. 100 is provided to introduce a selection of concepts in a much simplified form, for example, distributed devices 1016 and 1017 may need to go through a firewall to connect data analysis engine 1007, and data accessed or received from data stream 1006 and/or storage system 1011 by data analysis engine 1007 may be filtered by data filters, etc.

Figure 1A:
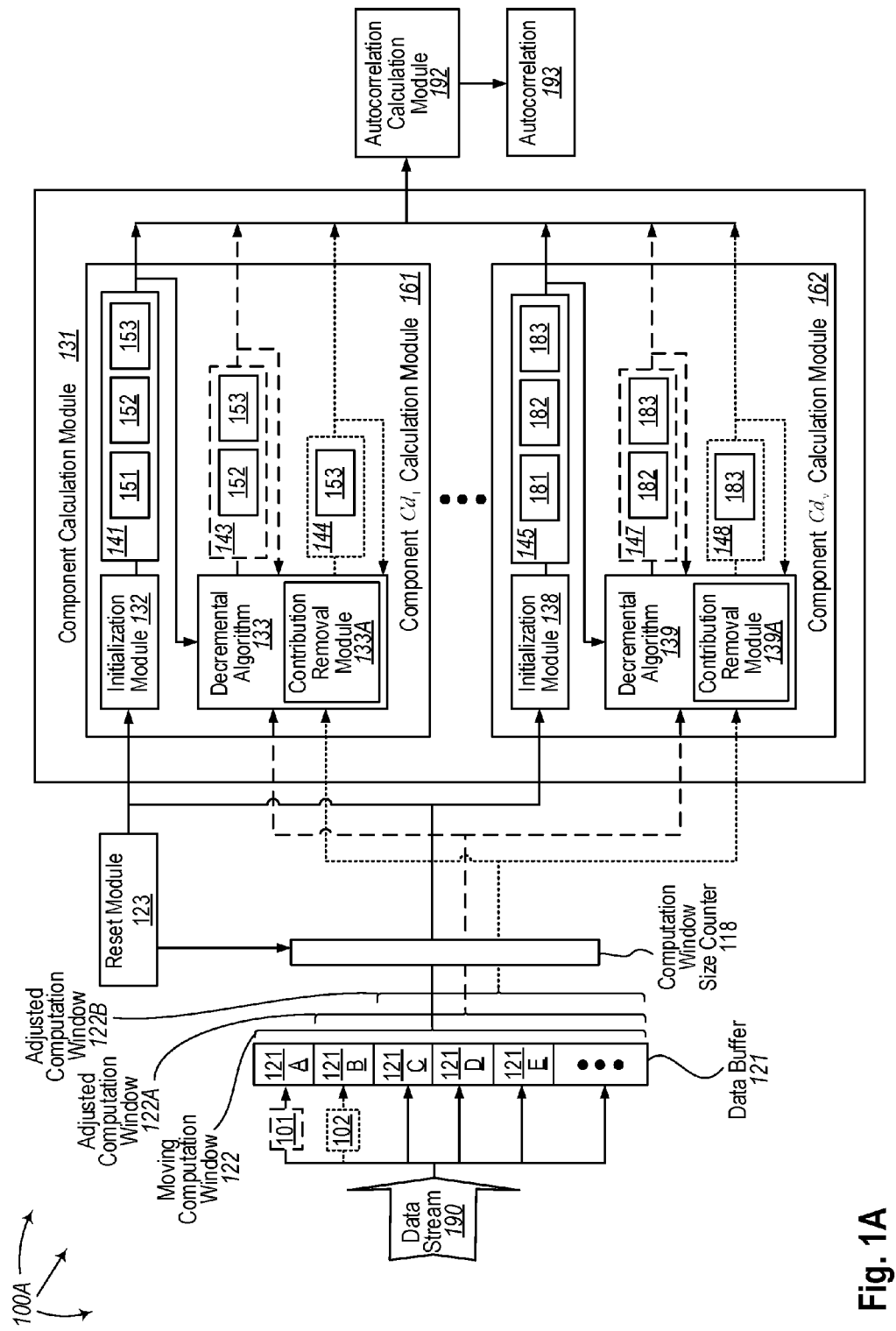
FIG. 1A illustrates an example computing device architecture that facilitates decrementally calculating autocorrelation for Big Data or streamed data with all components being directly decrementally calculated.

FIG. 1A illustrates an example computing device architecture 100A that facilitates decrementally calculating autocorrelation for streamed data with all components (p ($p=v\geq1$)) being directly decrementally calculated. FIG. 1A illustrates 1007 and 1006 shown in FIG. 1. Referring to FIG. 1A, computing device architecture 100A includes component calculation module 131. Component calculation module 131 may be connected to (or is part of) a network, such as, for example, a Local Area Network ("LAN"), a Wide Area Network ("WAN"), and even the Internet. Accordingly, component calculation module 131 as well as any other connected computing devices and their components, may send and receive message related data (e.g., Internet Protocol ("IP") datagrams and other higher layer protocols that utilize IP datagrams, such as, User Datagram Protocol ("UDP"), Real-time Streaming Protocol ("RTSP"), Real-time Transport Protocol ("RTP"), Microsoft Media Server ("MMS"), Transmission Control Protocol ("TCP"), Hypertext Transfer Protocol ("HTTP"), Simple Mail Transfer Protocol ("SMTP"), etc.) over the network. The output of component calculation module 131 will be used as the input of autocorrelation calculation module 192, and autocorrelation calculation module 192 will generate correlation 193.

In general, data stream 190 may be a sequence of digitally encoded signals (e.g., packets of data or data packets) used to transmit or receive information that is in the process of being transmitted. Data stream 190 may stream data elements, such as, for example, stock quotes, audio data, video data, geospatial data, web data, mobile communication data, online gaming data, banking transaction data, sensor data, closed-captioning data, etc., to computing device architecture 100A. Data stream 190 may stream stored data or be a live stream.

As streamed data elements are accessed or received, the streamed data elements will be removed from a location within a data buffer 121. For example, data element 101 will be removed from location 121A.

Subsequently, data element 102 may be accessed or received. Data element 102 will be removed from location 121B.

As depicted, data buffer 121 has multiple existing data elements in locations 121A, 121B, 121C, 121D, 121E and other locations before accessing or receiving data element 101. Computation window size will be decreased and the computation window will be transitioned to a new computation window as existing data elements are removed from data buffer 121.

Computation window size counter 118 may be implemented in hardware or software. When it is implemented in hardware, counter 118 may be a small device that may update a computation window size stored in a location in counter 118. When it is implemented in software, counter 118 may be just a variable stored in RAM, hard drive or any other computing-device-readable storage media, and the content or value of counter 118 is a computation window size. Computation window size counter 118 may be used to keep track the size of a computation window. Whenever receiving a data element, the computing device adjusts the computation window by removing the data element from the computation window and adjusts the computation window size counter 118 by decreasing its content or value by 1.

Computation window size counter 118 may be accessed or received by component calculation module 131, and it may be set to a specific value by reset module 129 when decremental skewness autocorrelation calculation starts working on a non-empty computation window. Within the description of this disclosure, a computation window size counter is equivalent to a computation window size and may be used interchangeably.

For example, as depicted in FIG. 1A, before accessing or receiving data element 101, the computation window 122 contains multiple data elements in locations 121A, 121B, . . . , so the computation window size should be initialized as the number of data elements contained in computation window 122. When data element 101 is accessed or received and removed from location 121A, data element 101 is removed from computation window 122 and computation window 122 is transitioned to computation window 122A, and the computation window size counter 118 is decreased by 1. Computation window size counter 118 will be stored in storage device 119. Both the computation window size counter 118 and the data element 101 may be accessed by component calculation module 131.

Subsequently, data element 102 may be accessed or received. Data element 102 will be removed from location 121B. Computation window 122A will be transitioned to computation window 122B. The counter 118 will be decreased by one. Both the adjusted computation window size counter 118 and the data element 102 may be accessed by component calculation module 131.

In general, component calculation module 131 comprises v (v=p≥1) component calculation modules for directly decrementally calculating v components of autocorrelation at the specified lag for a set of n data elements in a computation window. The number v varies depending on which decremental algorithm is used. As depicted in FIG. 1A, component calculation module 131 comprises component $Cd_1$ calculation module 161 and component $Cd_v$ calculation module 162, and there are v−2 other component calculation modules between them. What between them could be component $Cd_2$ calculation module, component $Cd_3$ calculation module, . . . , and component $Cd_{v-1}$ calculation module. Each component calculation module calculates a specific component at the given lag. v components are calculated. Component $Cd_1$ calculation module 161 comprises initialization module 132 for calculating the initial value of component $Cd_1$ at the given lag and decremental algorithm 133 for directly decrementally calculating component $Cd_1$ at the given lag. Component $Cd_v$ calculation module 162 comprises initialization module 138 for initializing component $Cd_v$ at the given lag and decremental algorithm 139 for directly decrementally calculating component $Cd_v$ at the given lag. Initialization module 132 is configured to initialize component $Cd_1$ at the given lag for data elements in a computation window and initialization module 138 is configured to initialize component $Cd_v$ at the given lag for data elements in a computation window. Component $Cd_1$ 141 is the initial value of component $Cd_1$. Initialization module 132 may be used for an initialization of component $Cd_1$ or when autocorrelation calculations are reset. Initialization module 132 may initialize component $Cd_1$ 141 to be a specific value (e.g., contribution 151, contribution 152 and contribution 153) passed in by reset module 123 when the computation window is non-empty and the component $Cd_1$ 141 has already been calculated. Similarly, initialization module 138 may be used for an initialization of component $Cd_v$ or when autocorrelation calculations are reset. Component $Cd_v$ 145 is the initial value of component $Cd_v$. Initialization module 138 may initialize component $Cd_v$ 145 to be a specific value (e.g., contribution 181, contribution 182 and contribution 183) passed in by reset module 123 when the computation window is non-empty and the component $Cd_v$ 145 has already been calculated.

Decremental algorithms are also configured to directly decrementally calculate v component values at the given lag l for a set of data elements in a computation window. Decremental algorithm 133 accesses or receives a prior component $Cd_1$ at the given lag l, l data elements from each side of the computation window and a data element removed from the computation window as input. Decremental algorithm 133 directly decrementally calculates a new component $Cd_1$ at a given lag from the prior component $Cd_1$ at the given lag l for the prior computation window, l data elements from each side of the computation window and the data element removed from the computation window. Contribution removal module 133A may mathematically remove any contribution for the data element removed from the computation window from component $Cd_1$ at the given lag for the prior computation window. Mathematically removing any contribution of the accessed or received data element may be used for directly decrementally calculating component $Cd_1$ at the given lag for the computation window. Decremental algorithm 139 works in a similar way as decremental algorithm 133. Decremental algorithm 139 accesses or receives a component $Cd_v$ at a given lag for the prior computation window, l data elements from each side of the computation window and a data element removed from the computation window as input. Decremental algorithm 139 directly decrementally calculates a new component $Cd_v$ at the given lag for the prior computation window from the component $Cd_v$ at the given lag for the prior computation window, l data elements from each side of the computation window and the data element removed from the computation window. Contribution removal module 139A may mathematically remove any contribution of the data element removed from the computation window from the prior component $Cd_v$ at the given lag l. Mathematically removing any contribution of the accessed or received data element may be used for directly decrementally calculating component $Cd_v$ at the given lag l for the computation window.

Referring to FIG. 1A, computing device architecture 100A includes an autocorrelation calculation module 192 and an autocorrelation 193. Once all p components of an autocorrelation at the specified lag l are directly decrementally calculated by component calculation module 131, autocorrelation calculation module 192 may calculate the autocorrelation 193 at the given lag l by using one or more decrementally calculated components at the given lag l.

The computing device keeps accessing or receiving a new data element, removing the data element from data buffer 121, adjusting the computation window and the computation window size, directly decrementally calculating v (1≤v≤p) components at the specified lag l, and calculating autocorrelation at the specified lag l as needed, and the computing device may repeat this process for as many times as needed.

Figure 1B:
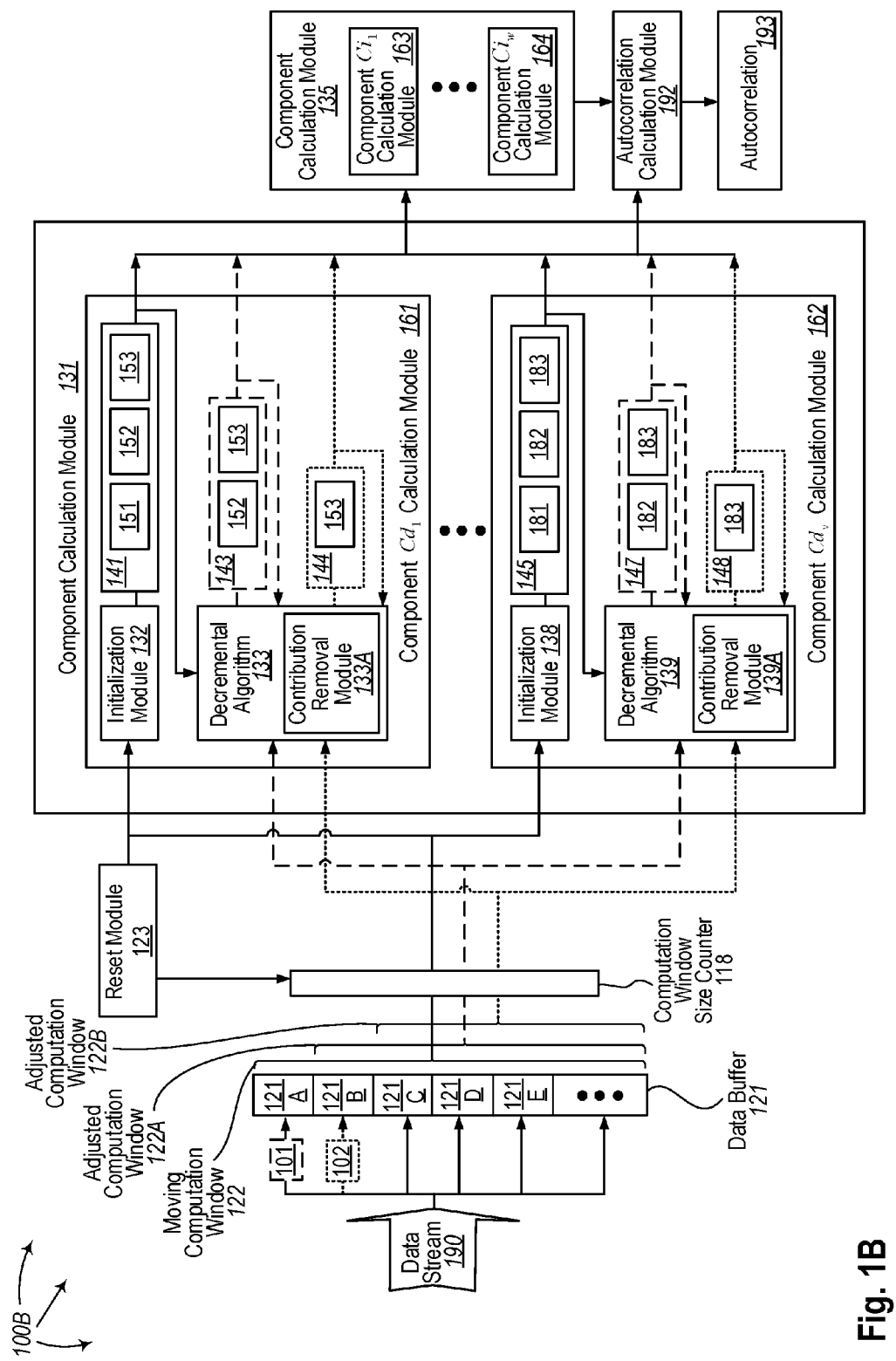
FIG. 1B illustrates an example computing device architecture that facilitates decrementally calculating autocorrelation for Big Data or streamed data with some components being directly decrementally calculated and some components being indirectly decrementally calculated.

FIG. 1B illustrates an example computing device architecture 100B that facilitates decrementally calculating autocorrelation for streamed data with some (v (1≤v≤p)) components being directly decrementally calculated and some (w (w=p−v)) components being indirectly decrementally calculated. The number v as well as the number w is algorithm dependent. Many parts included in computing device architectures 100B and 100A have same reference numbers. Those parts have similar structures and work in similar ways. In certain implementations, the difference between computing device architectures 100B and 100A may be that architecture 100B includes a component calculation module 135. All parts except component calculation module 135 in 100B work in a similar way as those parts with the same reference numbers in 100A. Instead of repeating what have already been explained in the description about 100A, only the different part is discussed here. Computing device architecture 100B also includes component calculation module 131, which also includes v component calculation modules for directly decrementally calculating v components, however the number v in 100B may not be the same number v as in 100A, because some directly decrementally calculated components in 100A are indirectly decrementally calculated in 100B. In 100A, v=p≥1, but in 100B, 1≤v<p. Referring to FIG. 1B, computing device architecture 100B also includes component calculation module 135. The output of components calculation module 131 may be used as the input of component calculation module 135, and the output of calculation modules 131 and 135 may be used as the input of autocorrelation calculation module 192, and autocorrelation calculation module 192 may generate autocorrelation 193. Component calculation module 135 generally includes w=p−v component calculation modules for indirectly decrementally calculating w components. For example, at a given lag, component calculation module 135 includes calculation module 163 for indirectly decrementally calculating component $Ci_1$ at the given lag and calculation module 164 for indirectly decrementally calculating component $Ci_w$ at the given lag, and there are w−2 component calculation modules in between. Indirectly decrementally calculating w components at the given lag includes indirectly decrementally calculating each of the w components at the given lag one by one. Indirectly decrementally calculating a component at the given lag includes accessing and using one or more components at the given lag other than the component itself. The one or more components at the given lag could have been initialized, directly decrementally calculated or indirectly decrementally calculated.

Referring to computing device architecture 100B, once w=p−v components at the given lag have been indirectly decrementally calculated (totally p (p=v+w) components at the given lag have been calculated), autocorrelation calculation module 192 may be used for calculating an autocorrelation 193 at the given lag by using one or more decrementally calculated components at the given lag.

Figure 2:
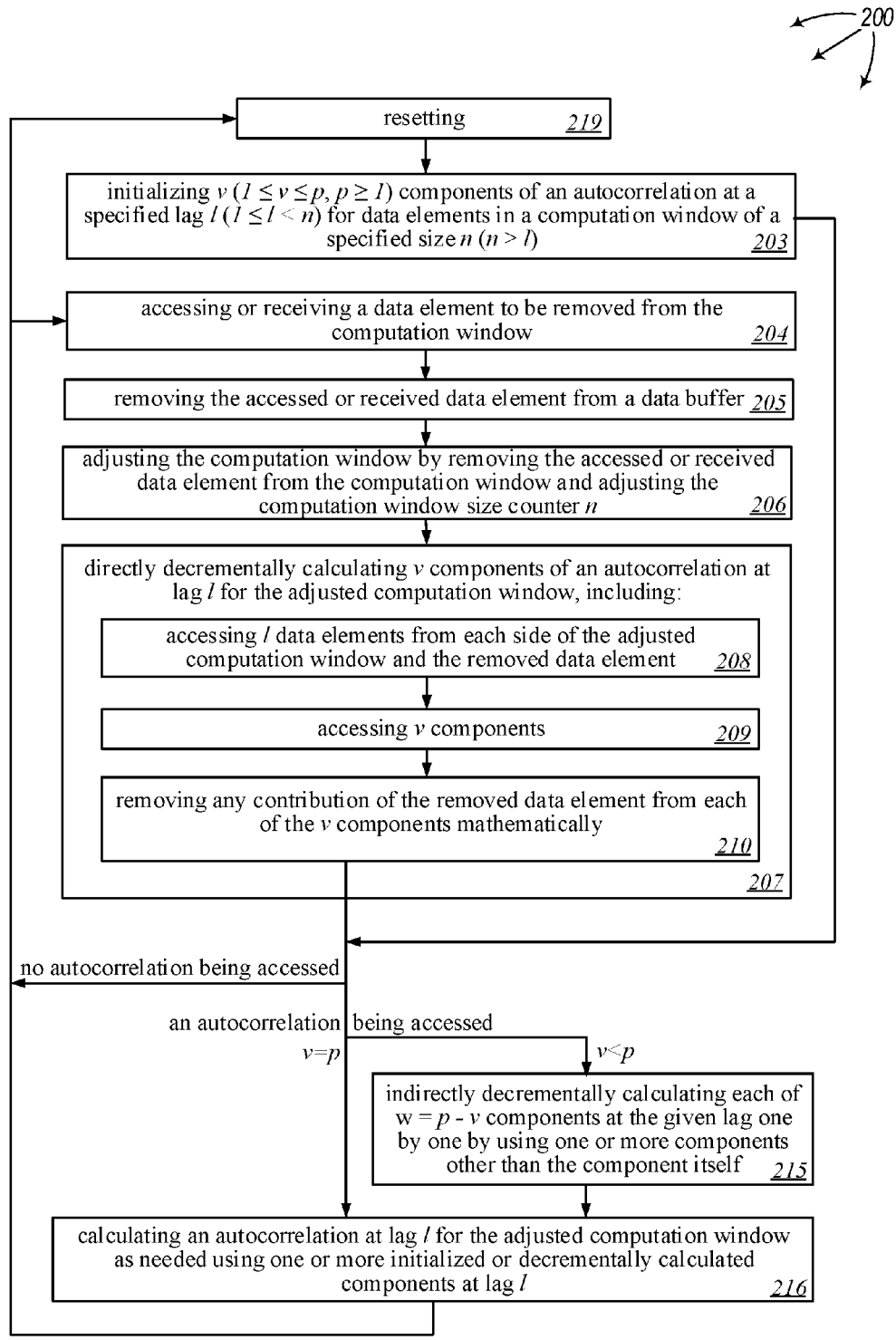
FIG. 2 illustrates a flow chart of an example method for decrementally calculating an autocorrelation for Big Data or streamed data.

FIG. 2 illustrates a flow chart of an example method 200 for decrementally calculating autocorrelation for streamed data. Method 200 will be described with respect to the components and data of computing device architectures 100A and 100B.

Method 200 includes at a specified lag 1 initializing v (1≤v≤p, p≥1) components of an autocorrelation for data elements in a computation window with a specified size n (203). For example, initialization module 132 may initialize component $Cd_1$ 141 at the given lag with contribution 151 (a contribution from data element 101), contribution 152 (a contribution from data element 102) and contribution 153 (contribution from other data elements). Similarly, initialization module 138 may initialize component $Cd_v$ 145 at the given lag with contribution 181 (a contribution from data element 101), contribution 182 (a contribution from data element 102) and contribution 183 (contribution from other data elements).

Method 200 includes indirectly decrementally calculating each of w=p−v components at the given lag l one by one as needed using one or more components other than the component itself (215), and then calculating autocorrelation at the given lag using one or more components at the given lag. Method 200 includes accessing or receiving a data element to be removed from the computation window (204). For example, data element 101 may be accessed or received.

Method 200 includes removing the accessed or received data element from a data buffer (205). For example, after accessing or receiving data element 101, data element 101 may be removed from a data buffer 121.

Method 200 includes removing the accessed or received data element from the computation window and adjusting the computation window size counter (206). For example, data element 101 may be accessed or received. Data element 101 may be removed from computation window 122 which then is transitioned to computation window 122A. Computation window size counter 118 may be adjusted by decreasing its current value by 1 upon accessing or receiving the data element 101.

Method 200 includes directly decrementally calculating v (1≤v≤p) components of a next autocorrelation at the given lag l for the adjusted computation window by using the v components at the given lag l for the prior computation window, l data elements from each side of the computation window respectively and the data element removed from the computation window (207) and then storing the v calculated components (211). For example, at the given lag l, decremental algorithm 133 may be used for directly decrementally calculating component $Cd_1$ 143 from component $Cd_1$ 141 and data element 101 removed from computation window 122. Similarly, decremental algorithm 139 may be used for directly decrementally calculating component $Cd_v$ 147 from component $Cd_v$ 145 and data element 101 removed from computation window 122.

Directly decrementally calculating v components of a next autocorrelation at the given lag l includes accessing l data elements from each side of the computation window and the data element removed from the computation window (208). For example, decremental algorithm 133 may access data element 101, data element in location 121B (i.e., data element 102), and data element in the right most location of computation window 122 when calculating $Cd_1$ at lag l=1. Similarly, decremental algorithm 139 may access data element 101, data element in location 121B (i.e., data element 102), and the data element in the right most location of computation window 122 when calculating $Cd_v$ at lag l=1.

Directly decrementally calculating v components of a next autocorrelation at the given lag includes accessing each of the v components of the autocorrelation in the prior computation window (209). For example, decremental algorithm 133 may access component $Cd_1$ 141. Similarly, decremental algorithm 139 may access component $Cd_v$ 145.

Directly decrementally calculating v components of a next autocorrelation at the given lag includes mathematically removing any contribution of the data element removed from the computation window from each of the v components (210). For example, directly decrementally calculating component $Cd_1$ 143 may include contribution removal module 133A mathematically removing contribution 151 from component $Cd_1$ 141, and directly decrementally calculating component $Cd_v$ 147 may include contribution removal module 139A mathematically removing contribution 181 from component $Cd_v$ 145. Contribution 151 and 181 are contributions from data element 101. As depicted, component $Cd_1$ 143 includes contribution 152 and contribution 153. Contribution 152 is a contribution from data element 102. Contribution 153 is a contribution from other data elements. Similarly, as depicted, component $Cd_v$ 147 includes contribution 182 and contribution 183. Contribution 182 is a contribution from data element 102. Contribution 183 is a contribution from other data elements.

Method 200 includes indirectly decrementally calculating w (w=p−v) components as needed (216), i.e., only when not all p components are directly decrementally calculated (e.g., as depicted in FIG. 1B) and an autocorrelation is accessed.

Method 200 includes calculating autocorrelation on a needed basis: when an autocorrelation is accessed, autocorrelation at the specified lag will be calculated; else only the v components will be directly decrementally calculated for every data change in the computation window. Method 200 includes indirectly decrementally calculating each of w (w=p−v) components one by one as needed by using one or more components at the given lag other than the component itself (215), and calculating autocorrelation at the given lag using one or more components at the given lag (216). For example, in architecture 100A, autocorrelation calculation module 192 may calculate autocorrelation 193 at the given lag. For example, in architecture 100B, component calculation module 135 may indirectly decrementally calculate w components ranging from component $Ci_1$ to component $Ci_w$ at the given lag, and autocorrelation calculation module 192 may calculate autocorrelation 193 at the given lag using one or more decrementally calculated components at the given lag.

204-213 may be repeated as streamed data elements are accessed or received. 214-218 may be repeated as needed when an autocorrelation is accessed. For example, subsequent to calculating component $Cd_1$ 143 and component $Cd_v$ 147 at the specified lag, data element 102 may be accessed or received.

Method 200 includes accessing or receiving a data element to be removed from the computation window subsequent to accessing or receiving the one data element (204); updating the computation window by removing the newly accessed or received data element from the computation window, adjusting the computation window size counter by decreasing its value by 1 (205). For example, data element 102 may be accessed or received subsequent to accessing or receiving data elements 101, and computation window size counter 118 will be adjusted by decreasing its value by 1 when data element 102 is accessed or received.

Method 200 includes directly decrementally calculating v components of a next autocorrelation at the given lag for the adjusted computation window by using the v components of the autocorrelation for the prior computation window (207). For example, at the given lag l, decremental algorithm 133 may be used for directly decrementally calculating component $Cd_1$ 144 by using component $Cd_1$ 143, and similarly decremental algorithm 139 may be used for directly decrementally calculating component $Cd_v$ 148 by using component $Cd_v$ 147.

Directly decrementally calculating the v components of a next autocorrelation at the given lag l includes accessing l data elements on each side of the computation window and the data element removed from the computation window (208). For example, decremental algorithm 133 may access data element 102, data element in location 121C and data element in the right most location of computation window 122A when calculating component $Cd_1$ at lag l=1. Similarly, decremental algorithm 139 may access data element 102, data element in location 121C and data element in the right most location of computation window 122A when calculating component $Cd_v$ at lag l=1.

Directly decrementally calculating the v components of a next autocorrelation at the given lag includes accessing each of the v components of the autocorrelation at the given lag in the previous computation window (209). For example, decremental algorithm 133 may access component $Cd_1$ 143 at the given lag. Similarly, decremental algorithm 139 may access component $Cd_v$ 147 at the given lag.

Directly decrementally calculating the v components of a next autocorrelation at a given lag includes mathematically removing any contribution of the data element removed from the computation window from each of the v components at the given lag (210). For example, directly decrementally calculating component $Cd_1$ 144 at lag l=5 may include contribution removal module 133A mathematically removing contribution 152 from component 143 at lag l=5, and directly decrementally calculating component $Cd_v$ 148 at lag l=5 may include contribution removal module 139A mathematically removing contribution 182 from component $Cd_v$ 147 at lag l=5. Contribution 153 and 183 are contributions from data element 102.

As depicted in FIGS. 1A and 1B, at a given lag, component $Cd_1$ 144 includes contribution 153 (a contribution from other data elements). Similarly, component $Cd_v$ 148 includes contribution 183 (a contribution from other data elements).

Once the v components at the specified lag have been directly decrementally calculated and stored, method 200 includes step(s) that is(are) executed depending on whether an autocorrelation is accessed. If not, method 200 includes accessing or receiving a data element and starting calculation for next computation window (204). If yes, method 200 includes indirectly decrementally calculating w (w=p−v) components at the given lag as needed (215), calculating autocorrelation at the given lag using one or more decrementally calculated components at the given lag (216). For example, in architecture 100A, autocorrelation calculation module 192 may calculate autocorrelation 193 at the given lag. In architecture 100B, component calculation module 135 may indirectly decrementally calculate w components ranging from component $Ci_1$ to component $Ci_w$ at the given lag, and autocorrelation calculation module 192 may calculate autocorrelation 193 at the given lag.

When a next data element is accessed or received, component $Cd_1$ 144 may be used for directly decrementally calculating a next component $Cd_1$ and component $Cd_v$ 148 may be used for directly decrementally calculating a next component $Cd_v$.

As depicted, methods 200 includes resetting 219 which may be used for resetting decremental autocorrelation calculation. When resetting 219 is invoked either after 211 or 216, the computation window size counter and v ($1 \leq v \leq p$) components of autocorrelation at the specified lag will be initialized. For example, component $Cd_1$ 141 may be initialized according to its definition using data elements in the computation window or initialized to a specific value if the value has already been calculated. The latter case may happen when combining decremental autocorrelation calculation with iterative autocorrelation calculation or incremental autocorrelation calculation. Component $Cd_v$ 145 may be initialized in the same way.

Figure 3A:
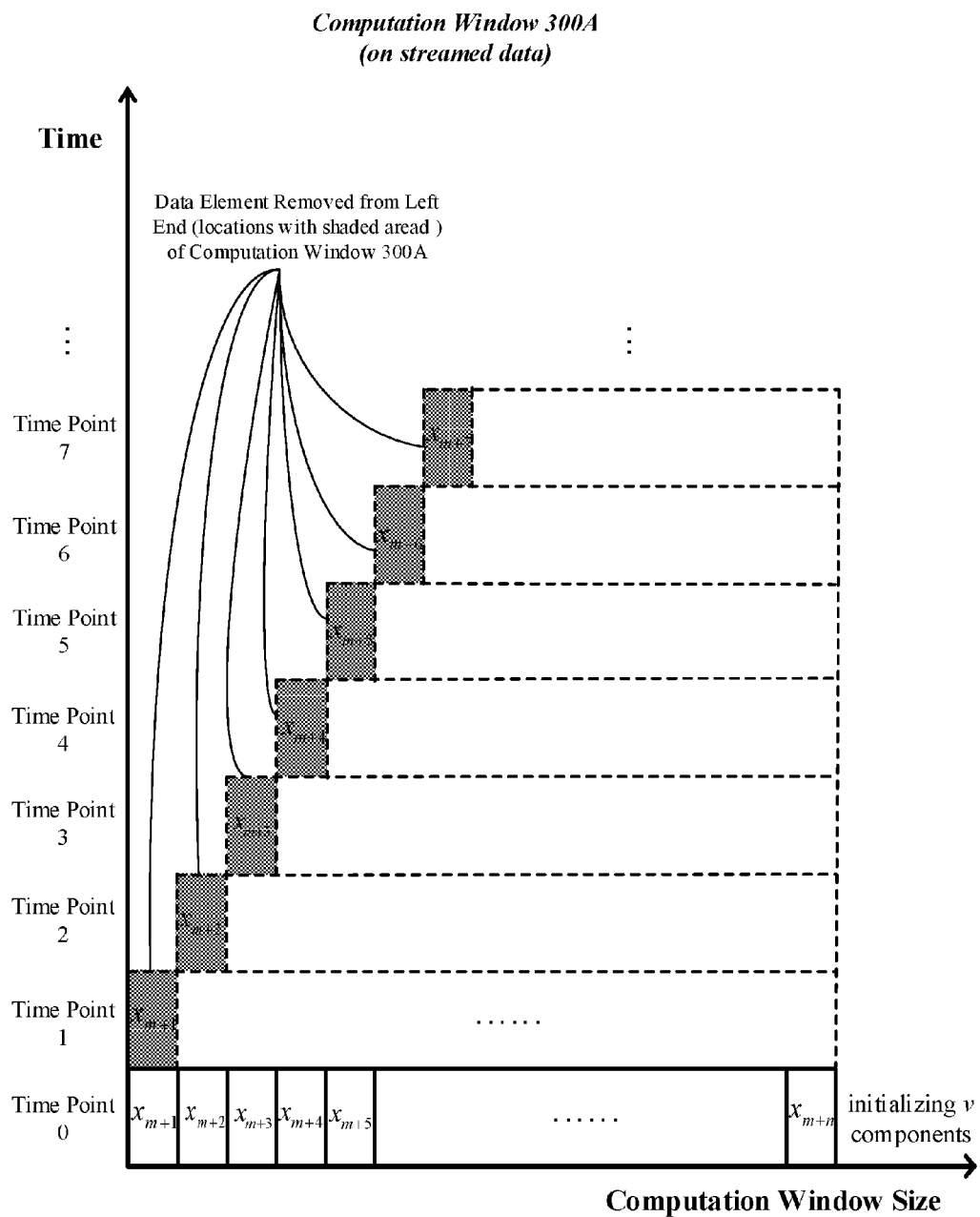
FIG. 3A illustrates data that is removed from the left side of a computation window 300A for decrementally calculating an autocorrelation.

FIG. 3A illustrates data that is removed from the left side of a computation window 300A for decrementally calculating autocorrelation at a specified lag on streamed data. Computation window 300A should be non-empty (assuming computation window 300A initially contains n data elements $x_{m+1}, x_{m+2}, \ldots, x_{m+n}$). One or more (v ($1 \leq v \leq p$)) components may be either initialized with specific values if they have already been calculated (e.g., when decremental autocorrelation calculation is combined with iterative autocorrelation calculation or incremental autocorrelation calculation) or initially calculated according to their definitions using data elements in computation window 300A. As time progresses, data elements in computation window 300A, for example, data element $x_{m+1}$, then data element $x_{m+2}$, then $x_{m+3}$, ... is removed from the left side of computation window 300A respectively.

Figure 3B:
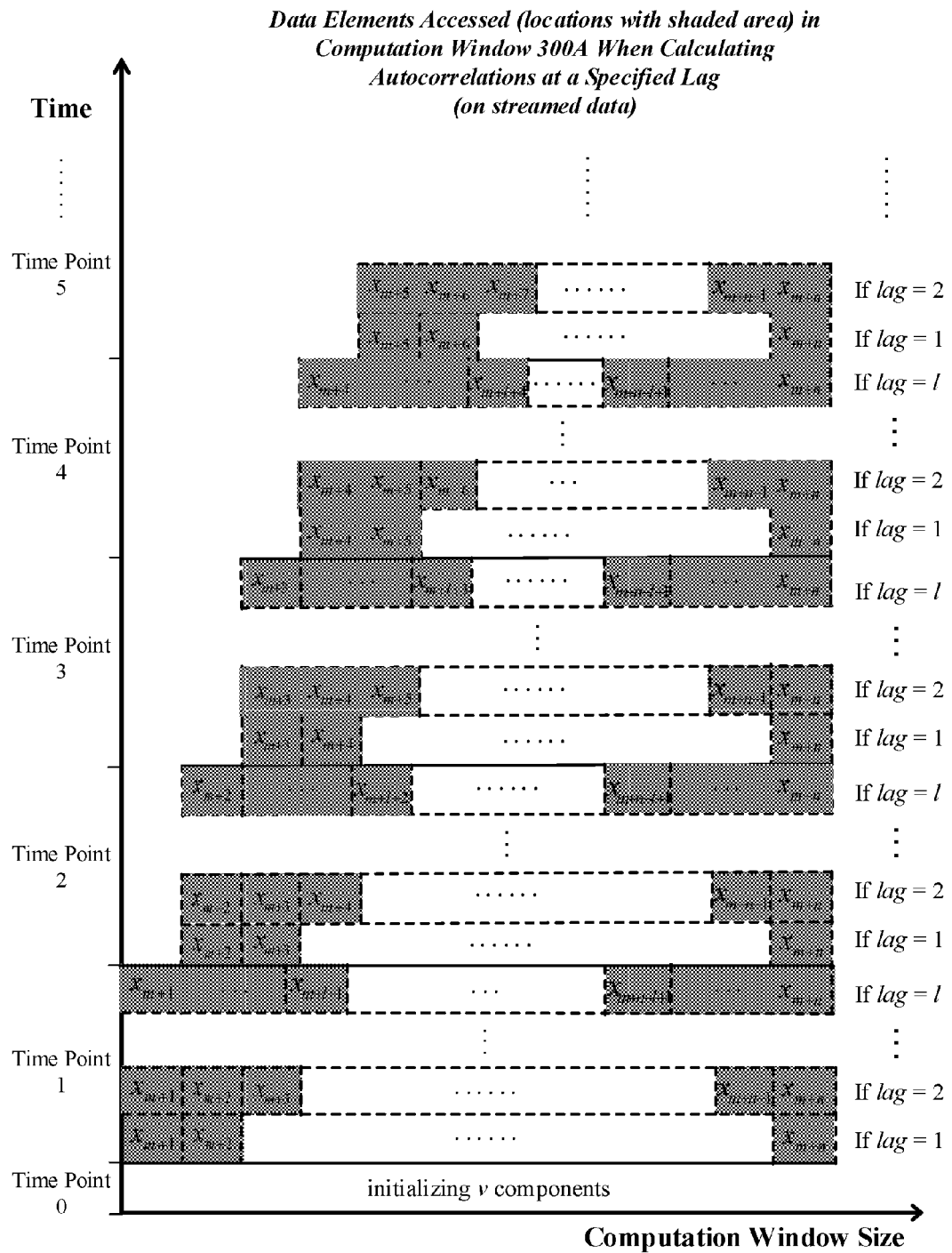
FIG. 3B illustrates data that are accessed from a computation window 300A for decrementally calculating autocorrelation at a specified lag when least recent data elements are removed from the left side of computation window 300A.

FIG. 3B illustrates data that are accessed from a computation window 300A for directly decrementally calculating next v components at a specified lag l ($1 \leq l < n$) on streamed data, indirectly decrementally calculating w=p−v components as needed and calculating an autocorrelation as needed by using one or more decrementally calculated components. The v components at the given lag l may be directly decrementally calculated from l data elements from each side of computation window 300A respectively, an existing data element removed from the computation window, and the v components at the given lag l for the previous computation window. For example, if lag l=1, 1 data elements from left side and 1 data element from the right side of computation window 300A plus an existing data element removed from computation window 300A are accessed, and if lag l=2, 2 data elements from left side and 2 data elements from the right side of computation window 300A plus an existing data element removed from computation window 300A are accessed, ..., and if lag l=l, l data elements from the left side and l data elements from the right side of computation window 300A plus an existing data element removed from computation window 300A are accessed. Thus, the computation workload is reduced. The larger the n, the more substantial the reduction in computation workload.

Figure 3C:
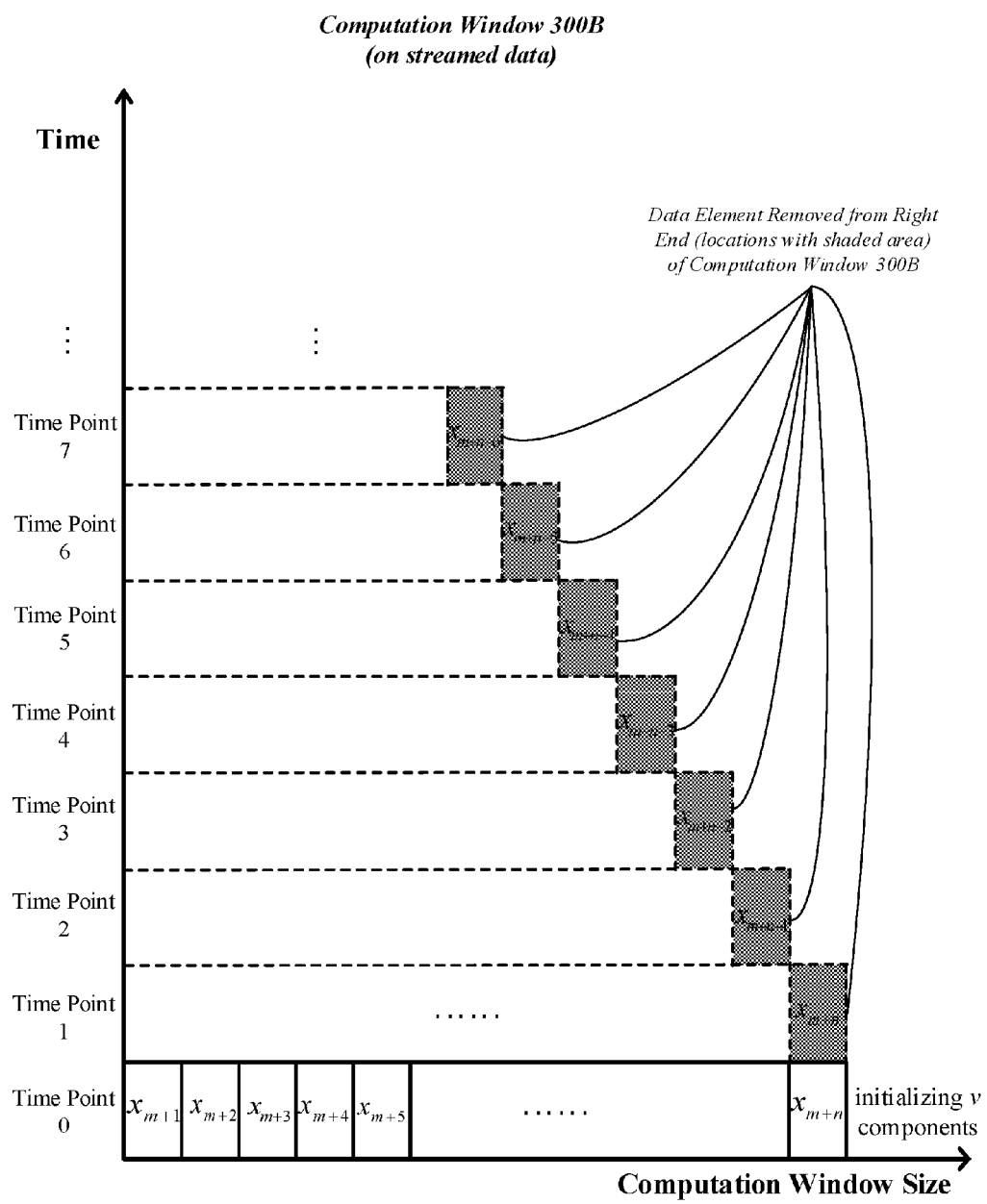
FIG. 3C illustrates data that is removed from the right side of a computation window 300B for decrementally calculating an autocorrelation.

FIG. 3C illustrates data that is removed from the right side of a computation window 300B for decrementally calculating autocorrelation at a specified lag on streamed data. Computation window 300B should be non-empty (assuming computation window 300B initially contains n data elements $x_{m+1}, x_{m+2}, \ldots, x_{m+n}$). One or more (v ($1 \leq v \leq p$)) components may be either initialized with specific values if they have already been calculated (e.g., when decremental autocorrelation calculation is combined with iterative autocorrelation calculation or incremental autocorrelation calculation) or initially calculated according to their definitions using data elements in computation window 300B. As time progresses, data elements located in the right side of computation window 300B, for example, data element $x_{m+n}$, then data element $x_{m+n-1}$, then $x_{m+n-2}$, ... is removed from the right side of computation window 300B respectively.

Figure 3D:
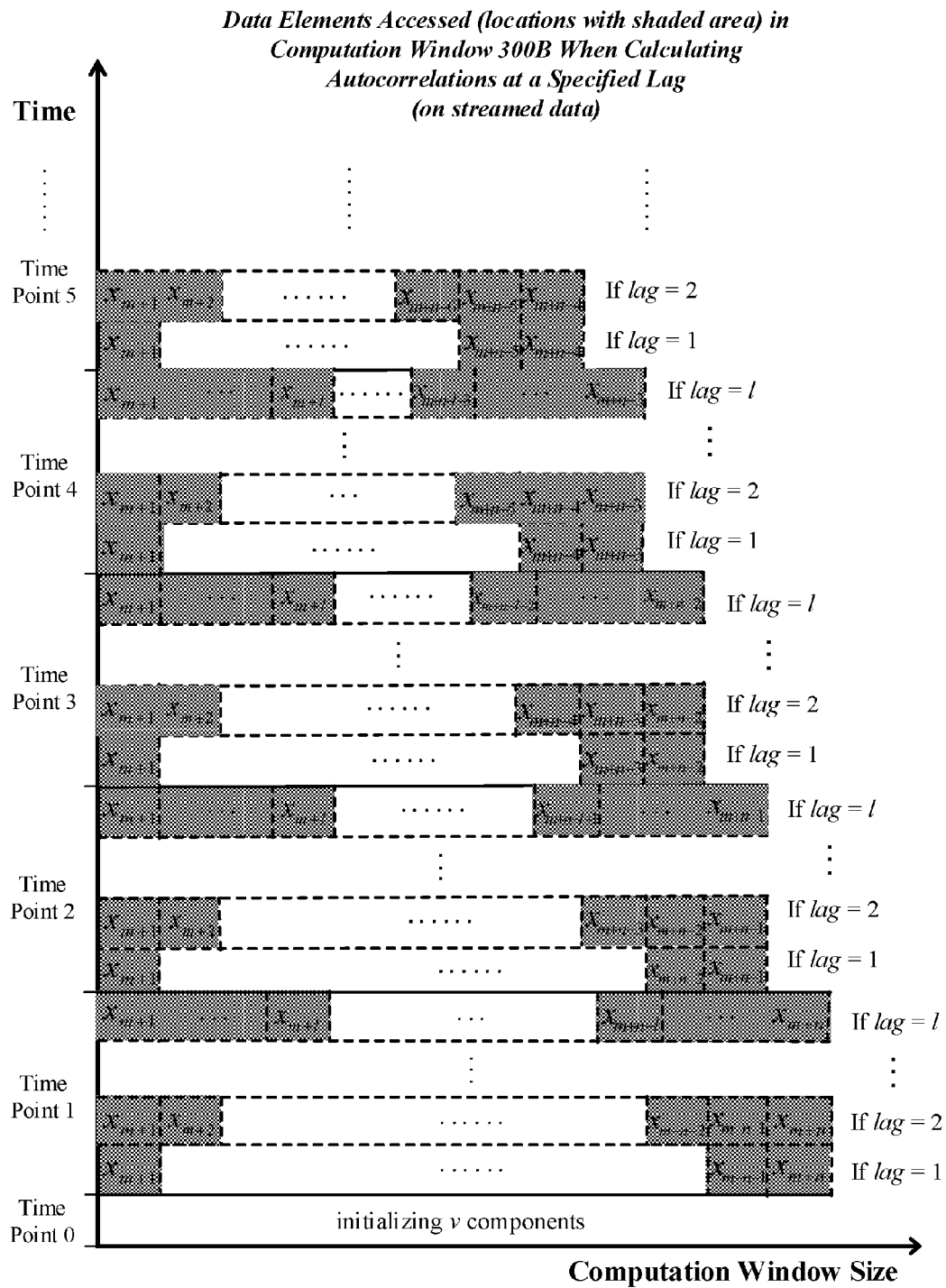
FIG. 3D illustrates data that are accessed from a computation window 300B for decrementally calculating autocorrelation at a specified lag when most recent data elements are removed from the right side of computation window 300B.

FIG. 3D illustrates data that are accessed from a computation window 300B for directly decrementally calculating next v components at a specified lag l ($1 \leq l < n$) on streamed data, indirectly decrementally calculating w=p−v components as needed and calculating an autocorrelation as needed by using one or more decrementally calculated components. The v components at the given lag l may be directly decrementally calculated from l data elements from each side of the computation window respectively plus an existing data element removed from the computation window and the v components at the given lag for the previous computation window. For example, if lag l=1, 1 data elements from left side and 1 data element from the right side of computation window 300B plus an existing data element removed from computation window 300B are accessed, and if lag l=2, 2 data elements from left side and 2 data elements from the right side of computation window 300B plus an existing data element removed from computation window 300B are accessed, ..., and when lag l=l, l data elements from the left side and l data elements from the right side of computation window 300B plus an existing data element removed from computation window 300B are accessed. Thus, the computation workload is reduced. The larger the n, the more substantial the reduction in computation workload.

FIG. 4A illustrates the definition of an autocorrelation. Suppose there is a streamed Big Data or time series data: data $x_{m+1}$ arrives at time point m+1, data $x_{m+2}$ arrives at time point m+2, ..., and data $x_{m+n}$ arrives at time point m+n, .... Define a computation window as a window on the streamed or time series data which contains the data elements to be involved in autocorrelation calculation. Suppose a computation window X composes of n data elements: $X=\{x_i | i=m+1, m+2, \ldots, m+n\}$ which is a window on the streamed Big Data or time series data, and an autocorrelation for the computation window needs to be recalculated whenever an existing data element is removed from the computation window. Suppose computation window X has changed, for example, one of the existing data elements $x_r$ ($m+1 \leq r \leq m+n$) is removed from computation window X. Whenever a data element is removed, the computation window is considered as a new computation window, and a new iteration of calculation is started.

The computing results of an autocorrelation is related to not only the value of each data element in the computation window but also the sequential order of each data element, so it should be handled differently when removing a data element from different positions within the computation window. There are three different cases:

1. removing a data element $x_r$ from the left most position of the computation window;
2. removing a data element $x_r$ from the right most position of the computation window;
3. removing a data element $x_r$ from any position within the computation window but not at either end.

The 3$^{rd}$ case rarely happens in time series data, so let's take the first two cases into consideration.

The equations for calculating one or more components for those two cases might be different. To distinguish them, define the adjusted computation window as $X^I$ for the former case and $X^{II}$ for the latter case. There is no difference between the equations for calculating a sum or a mean on $X^I$ and $X^{II}$, so do not distinguish the symbols for sum and mean for the two cases. Equation 401 is a traditional equation for calculating a sum $S_k$ of all the data elements in X. Equation 402 is a traditional equation for calculating a mean $\bar{x}_k$ of all the data elements in X. Equation 403 is a traditional equation for calculating an autocorrelation $\rho_{(k,l)}$ with a lag l of all the data elements in a computation window of size n. Equation 404 is a traditional equation for calculating a sum $S_{k+1}$ of all the data elements in the adjusted computation window $X^I$. Equation 405 is a traditional equation for calculating a mean $\bar{x}_{k+1}$ of all the data elements in the adjusted computation window $X^I$. Equation 406 is a traditional equation for calculating an autocorrelation $\rho^I_{(k+1,l)}$ of all the data elements in the adjusted computation window $X^I$. As stated earlier, when removing a data element $x_r$ from the right most position of the computation window, the adjusted computation window is defined as $X^{II}$. Equation 407 is a traditional equation for calculating an autocorrelation $\rho^{II}_{(k+1,l)}$ of all the data elements in the adjusted computation window $X^{II}$.

FIG. 4B illustrates some components of an autocorrelation and basic decremental component calculation equations. A component of an autocorrelation is a quantity or expression appearing in the autocorrelation's definition equation or any transforms of the definition equation. The following are some example components of an autocorrelation.

$$S_k = \sum_1^n x_i$$

$$\bar{x}_k = \frac{1}{n}\sum_1^n x_i$$

$$SS_k = \sum_1^n x_i^2$$

$$SX_k = \sum_1^n (x_i - \bar{x}_k)^2$$

$$\text{cov}X_{(k,l)} = \sum_{1+l}^n (x_i - \bar{x}_k)(x_{i-l} - \bar{x}_k) \quad (l \text{ is the lag})$$

An autocorrelation may be calculated based on one or more components or combinations of them, so there are multiple algorithms supporting decremental autocorrelation calculation. To illustrate how to use components to decrementally calculate autocorrelation, three different decremental autocorrelation calculation algorithms are given as examples. A new iteration of calculation is started whenever there is a data change in the computation window. A sum or a mean is the basic component to be used for calculating an autocorrelation. The equations for decrementally calculating a sum or a mean are basic decremental component equations which will be used by all example decremental autocorrelation calculation algorithms, therefore they are presented in FIG. 4B instead of each example decremental autocorrelation calculation algorithm. Equation 408 is an equation for decrementally calculating a sum $S_{k+1}$ of all the data elements in the adjusted computation window $X^I$ or $X^{II}$ by mathematically removing any contribution of the data element removed from the computation window from the previous sum. Equation 409 is an equation for decrementally calculating a mean $\bar{x}_{k+1}$ of all the data elements in the adjusted computation window $X^I$ or $X^{II}$ by mathematically removing any contribution of the data element removed from the computation window from the previous mean. Either a sum or a mean will be used in all three decremental autocorrelation calculation algorithms described later.

FIG. 4C illustrates the first example decremental autocorrelation calculation algorithm (decremental algorithm 1). As depicted in FIG. 4C, when removing a data element $x_r$ from the left most position of the computation window, decremental algorithm 1 comprises decremental calculation of components $S_{k+1}$ or $\bar{x}_{k+1}$, $SS_{k+1}$, $SX_{k+1}$, and $\text{cov}X^I_{(k+1,l)}$, and an autocorrelation $\rho^I_{(k+1,l)}$ may be calculated by using components $SX_{k+1}$ and $\text{cov}X^I_{(k+1,l)}$ once they are calculated. Equation 408 may be used for directly decrementally calculating component $S_{k+1}$ if component $S_k$ is available. Equation 409 may be used for directly decrementally calculating component $\bar{x}_{k+1}$ if component $\bar{x}_k$ is available. Equation 410 is a traditional equation for calculating component $SS_k$ in the computation window X. Equation 411 is a traditional equation for calculating component $SS_{k+1}$ in the adjusted computation window $X^I$. Equation 412 is an equation that may be used for directly decrementally calculating component $SS_{k+1}$ in the adjusted computation window $X^I$ if component $SS_k$ is available. Equation 413 is a traditional equation for calculating component $SX_k$ in the computation window X. Equation 414 is a traditional equation for calculating component $SX_{k+1}$ in the adjusted computation window $X^I$. Equations 415 are equations that may be used for indirectly decrementally calculating component $SX_{k+1}$ in the adjusted computation window $X^I$ if components $S_{k+1}$ or $\bar{x}_{k+1}$ and $SS_{k+1}$ are available. Equations 415 indeed comprise multiple equations but only one of them is needed depending on if a sum or a mean or both are available. Equation 416 is a traditional equation for calculating component $\text{cov}X_{(k,l)}$ in the computation window X. Equation 417 is a traditional equation for calculating component $\text{cov}X^I_{(k+1,l)}$ in the adjusted computation window $X^I$. Equations 418 are equations that may be used for directly decrementally calculating component $\text{cov}X^I_{(k+1,l)}$ in the adjusted computation window $X^I$ if components $\text{cov}X_{(k,l)}$, $SS_{k+1}$, $S_k$ or $\bar{x}_k$ and $S_{k+1}$ or $\bar{x}_{k+1}$ are available. Equations 418 indeed comprise multiple equations but only one of them is needed depending on if a sum or a mean or both are available. Equation 419 is an equation that may be used for calculating the autocorrelation $\rho^I_{(k+1,l)}$ at a given lag l for the adjusted computation window $X^I$ once $\text{cov}X^I_{(k+1,l)}$ and $SX_{k+1}$ are calculated. As depicted in FIG. 4C Cont'd, when removing a data element $x_r$ from the right most position of the computation window, decremental algorithm 1 comprises decremental calculation of components $S_{k+1}$ or $\bar{x}_{k+1}$, $SS_{k+1}$, $SX_{k+1}$, and $\text{cov}X^{II}_{(k+1,l)}$, and an autocorrelation $\rho^{II}_{(k+1,l)}$ may be calculated by using components $SX_{k+1}$ and $\text{cov}X^{II}_{(k+1,l)}$ once they are calculated. Equation 408 may be used for directly decrementally calculating component $S_{k+1}$ if component $S_k$ is available. Equation 409 may be used for directly decrementally calculating component $\bar{x}_{k+1}$ if component $\bar{x}_k$ is available. Equation 410 is a traditional equation for calculating component $SS_k$ in the computation window X. Equation 411 is a traditional equation for calculating component $SS_{k+1}$ in the adjusted computation window $X^{II}$. Equation 412 is an equation that may be used for directly decrementally calculating component $SS_{k+1}$ in the adjusted computation window $X^{II}$ if component $SS_k$ is available. Equation 413 is a traditional equation for calculating component $SX_k$ in the computation window X. Equation 414 is a traditional equation for calculating component $SX_{k+1}$ in the adjusted computation window $X^{II}$. Equations 415 are equations that may be used for indirectly decrementally calculating component $SX_{k+1}$ in the adjusted computation window $X^{II}$ if components $S_{k+1}$ and/or $\bar{x}_{k+1}$ and $SS_{k+1}$ are available. Equations 415 comprise multiple equations but only one of them is needed depending on if a sum or a mean or both are available. Equation 416 is a traditional equation for calculating component $\text{cov}X_{(k,l)}$ in the computation window X. Equation 420 is a traditional equation for calculating component $\text{cov}X^{II}_{(k+1,l)}$ in the adjusted computation window $X^{II}$. Equations 421 may be used for directly decrementally calculating component $\text{cov}X^{II}_{(k+1,l)}$ in the adjusted computation window $X^{II}$ if components $\text{cov}X_{(k,l)}$, $SS_{k+1}$, $S_k$ or $\bar{x}_k$ and $S_{k+1}$ or $\bar{x}_{k+1}$ are available. Equations 421 comprise multiple equations but only one of them is needed depending on if a sum or a mean or both are available. Equation 422 is an equation that may be used for calculating the autocorrelation $\rho^{II}_{(k+1,l)}$ at a given lag l for the adjusted computation window $X^{II}$ using components $\text{cov}X^{II}_{(k+1,l)}$ and $SX_{k+1}$ once they are calculated.

FIG. 4D illustrates the second example decremental autocorrelation calculation algorithm (decremental algorithm 2). As depicted in FIG. 4D, when removing a data element $x_r$ from the left most position of the computation window, decremental algorithm 2 comprises decremental calculation of components $S_{k+1}$ or $\bar{x}_{k+1}$, $SX_{k+1}$, and $\text{cov}X^I_{(k+1,l)}$, and an autocorrelation may be calculated by using components $SX_{k+1}$ and $\text{cov}X^I_{(k+1,l)}$, once they are calculated. Equation 408 may be used for directly decrementally calculating component $S_{k+1}$ if component $S_k$ is available. Equation 409 may be used for directly decrementally calculating component $\bar{x}_{k+1}$ if component $x_k$ is available. Equation 423 is a traditional equation for calculating component $SX_k$ in the computation window X. Equation 424 is a traditional equation for calculating component $SX_{k+1}$ in the adjusted computation window $X^I$. Equations 425 may be used for directly decrementally calculating component $SX_{k+1}$ in the adjusted computation window $X^I$ if components $SX_k$, $x_k$ or $S_k$ and $S_{k+1}$ or $\bar{x}_{k+1}$ are available. Equations 425 comprise multiple equations but only one of them is needed depending on if a sum or a mean or both are available. Equation 426 is a traditional equation for calculating component $covX_{(k,l)}$ in the computation window X. Equation 427 is a traditional equation for calculating component $covX^I_{(k+1,l)}$ in the adjusted computation window $X^I$. Equations 428 may be used for directly decrementally calculating component $covX^I_{(k+1,l)}$ in the adjusted computation window $X^I$ if components $covX_{(k,l)}$, $S_k$ or $\bar{x}_k$ and $S_{k+1}$ or $\bar{x}_{k+1}$ are available. Equations 428 comprise multiple equations but only one of them is needed depending on if a sum or a mean or both are available. Equation 429 may be used for calculating the autocorrelation $\rho^I_{(k+1,l)}$ for the adjusted computation window $X^I$ using components $covX^I_{(k+1,l)}$ and $SX_{k+1}$ once they are calculated. As depicted in FIG. 4D, when removing a data element $x_r$ from the right most position of the computation window, decremental algorithm 2 comprises decremental calculation of components $S_{k+1}$ or $\bar{x}_{k+1}$, $SX_{k+1}$, and $covX^{II}_{(k+1,l)}$, and an autocorrelation may be calculated by using components $SX_{k+1}$ and $covX^{II}_{(k+1,l)}$ once they are calculated. Equation 408 may be used for directly decrementally calculating component $S_{k+1}$ if component $S_k$ is available. Equation 409 may be used for directly decrementally calculating component $\bar{x}_{k+1}$ if component $x_k$ is available. Equation 423 is a traditional equation for calculating component $SX_k$ in the computation window X. Equation 424 is a traditional equation for calculating component $SX_{k+1}$ in the adjusted computation window $X^{II}$. Equations 425 may be used for directly decrementally calculating component $SX_{k+1}$ in the adjusted computation window $X^{II}$ if components $SX_k$, $S_k$ or $\bar{x}_k$ and $S_{k+1}$ or $\bar{x}_{k+1}$ are available. Equations 425 comprise multiple equations but only one of them is needed depending on if a sum or a mean or both are available. Equation 426 is a traditional equation for calculating component $covX_{(k,l)}$ in the computation window X. Equation 430 is a traditional equation for calculating component $covX^{II}_{(k+1,l)}$ in the adjusted computation window $X^{II}$. Equations 431 may be used for directly decrementally calculating component $covX^{II}_{(k+1,l)}$ in the adjusted computation window $X^{II}$ if components $covX_{(k,l)}$, $S_k$ or $\bar{x}_k$ and $S_{k+1}$ or $\bar{x}_{k+1}$ are available. Equations 431 comprise multiple equations but only one of them is needed depending on if a sum or a mean or both are available. Equation 432 may be used for calculating the autocorrelation $\rho^{II}_{(k+1,l)}$ for the adjusted computation window $X^{II}$ using components $covX^{II}_{(k+1,l)}$ and $SX_{k+1}$ once they are calculated.

FIG. 4E illustrates the third example decremental autocorrelation calculation algorithm (decremental algorithm 3). As depicted in FIG. 4E, when removing a data element $x_r$ from the left most position of the computation window, decremental algorithm 3 comprises decremental calculation of components $S_{k+1}$ or $\bar{x}_{k+1}$, $SX_{k+1}$, and $covX^I_{(k+1,l)}$, and an autocorrelation may be calculated by using components $SX_{k+1}$ and $covX^I_{(k+1,l)}$, once they are calculated. Equation 408 may be used for directly decrementally calculating component $S_{k+1}$ if component $S_k$ is available. Equation 409 may be used for directly decrementally calculating component $\bar{x}_{k+1}$ if component $x_k$ is available. Equation 433 is a traditional equation for calculating component $SX_k$ in the computation window X. Equation 434 is a traditional equation for calculating component $SX_{k+1}$ in the adjusted computation window $X^I$. Equations 435 may be used for decrementally calculating components $SX_{k+1}$ in the adjusted computation window $X^I$ if components $SX_k$, $S_k$ or $\bar{x}_k$ and $S_{k+1}$ or $\bar{x}_{k+1}$ are available. Equations 435 comprise multiple equations but only one of them is needed depending on if a sum or a mean is available. Equation 436 is a traditional equation for calculating component $covX_{(k,l)}$ in the computation window X. Equation 437 is a traditional equation for calculating component $covX^I_{(k+1,l)}$ in the adjusted computation window $X^I$. Equations 438 may be used for directly decrementally calculating component $covX^I_{(k+1,l)}$ in the adjusted computation window $X^I$ if components $covX_{(k,l)}$, $S_k$ or $\bar{x}_k$ and $S_{k+1}$ or $\bar{x}_{k+1}$ are available. Equations 438 comprise multiple equations but only one of them is needed depending on if a sum or a mean is available. Equation 439 may be used for calculating the autocorrelation $\rho^I_{(k+1,l)}$ for the adjusted computation window $X^I$ using components $covX^I_{(k+1,l)}$ and $SX_{k+1}$ once they are calculated. As depicted in FIG. 4E, when removing a data element $x_r$ from the right most position of the computation window, decremental algorithm 3 comprises decremental calculation of components $S_{k+1}$ or $\bar{x}_{k+1}$, $SX_{k+1}$, and $covX^{II}_{(k+1,l)}$, and an autocorrelation may be calculated by using components $SX_{k+1}$ and $covX^I_{(k+1,l)}$ once they are calculated. Equation 408 may be used for directly decrementally calculating component $S_{k+1}$ if component $S_k$ is available. Equation 409 may be used for directly decrementally calculating component $\bar{x}_{k+1}$ if component $\bar{x}_k$ is available. Equation 433 is a traditional equation for calculating component $SX_k$ in the computation window X. Equation 434 is a traditional equation for calculating component $SX_{k+1}$ in the adjusted computation window $X^{II}$. Equations 435 may be used for directly decrementally calculating component $SX_{k+1}$ in the adjusted computation window $X^{II}$ if components $SX_k$, $S_k$ or $\bar{x}_k$, and $S_{k+1}$ or $\bar{x}_{k+1}$ are available. Equations 435 comprise multiple equations but only one of them is needed depending on if a sum or a mean or both are available. Equation 436 is a traditional equation for calculating component $covX_{(k,l)}$ in the computation window X. Equation 440 is a traditional equation for calculating component $covX^{II}_{(k+1,l)}$ in the adjusted computation window $X^{II}$. Equations 441 may be used for directly decrementally calculating component $covX^{II}_{(k+1,l)}$ in the adjusted computation window $X^{II}$ if components $covX_{(k,l)}$, $S_k$ or $\bar{x}_k$ and $S_{k+1}$ or $\bar{x}_{k+1}$ are available. Equations 441 comprise multiple equations but only one of them is needed depending on if a sum or a mean is available. Equation 442 may be used for calculating the autocorrelation $\rho^{II}_{(k+1,l)}$ for the adjusted computation window $X^{II}$ using components $covX^{II}_{(k+1,l)}$ and $SX_{k+1}$ once they are calculated.

To demonstrate decremental autocorrelation calculation algorithms and their comparison against traditional algorithms, three examples are given below. Three computation windows of data elements are used. For traditional algorithms, the calculations for all three computation windows are exactly the same. For decremental algorithms, initialization of one or more components is performed for the first computation window, and decremental calculations are performed for the second and third computation windows.

FIG. 5A illustrates an example of calculating an autocorrelation at lag l=1 for streamed Big Data or data stream 501 using traditional algorithms. The example assumes a data element $x_r$ is removed from the left most position of the computation window. Computation window 502 includes 6 data elements in Big Data Set 501. Computation window size 503 (n) is 6. There are a total of 2 divisions, 11 multiplications, 14 additions, and 16 subtractions when calculating the autocorrelation on 6 data elements without any optimization.

The same equations may be used to calculate the autocorrelation at lag=1 for computation window 504 as shown in FIG. 5A Cont'd 1, however the computation window size 505 is decreased to 5. The calculation includes totally 2 divisions, 9 multiplications, 11 additions, and 13 subtractions when calculating the autocorrelation on 5 data elements without any optimization.

The same equations may also be used to calculate the autocorrelation at lag=1 for computation window 506 as shown in FIG. 5A Cont'd 2, however the computation window size 507 is decreased to 4. The calculation includes totally 2 divisions, 7 multiplications, 8 additions, 10 subtractions when calculating the autocorrelation on 4 data elements without any optimization. Traditional algorithms for calculating autocorrelation at a given lag l on n data elements typically take 2 divisions, 2n−1 multiplications, 3n−(l+3) additions, and 3n−2l subtractions without any optimization.

FIG. 5B illustrates an example of calculating an autocorrelation at lag l=1 using decremental algorithm 1. The example assumes a data element $x_r$ is removed from the left most position of the computation window, and a mean instead of a sum is used in the example. The calculations for computation window 502 use traditional equations to calculate the initial values of components $\bar{x}_1$, $SS_1$, $SX_1$, and $covX_{(1,1)}$. The autocorrelation of computation window 502 is then calculated by using those components. In practice, such calculation will not happen, because decremental autocorrelation calculation would start from a non-empty computation window where those components have already been calculated. Using traditional algorithms to calculate those components on this non-empty computation window here is only for the purpose of illustrating the decremental autocorrelation calculation algorithm. Equation 402 is used for calculating component $\bar{x}_1$. Equation 410 is used for calculating component $SS_1$. Equation 413 is used for calculating component $SX_1$. Equation 416 is used for calculating component $covX_{(1,1)}$. Equation 403 is used for calculating component $\rho_{(1,1)}$. The autocorrelation $\rho_{(1,1)}$ at lag l=1 for computation window 502 is calculated by using components $covX_{(1,1)}$ and $SX_1$. There are a total of 2 divisions, 13 multiplications, 14 additions, and 16 subtractions when calculating the autocorrelation at lag l=1 on a computation window of size 6.

However, starting from computation window 504, the components of the autocorrelation at lag l=1 for the adjusted computation window (e.g., 504) may be decrementally calculated from the components of the autocorrelation for the previous computation window (e.g., 502). The computation window size 505 is decreased to 5. For example, equation 409 may be used for decrementally calculating the component $x_2$ by using $\bar{x}_1$ previously calculated for computation window 502. Equation 412 may be used for decrementally calculating the component $SS_2$ by using $SS_1$ previously calculated for computation window 502. Equation 415 may be used for decrementally calculating the component $SX_2$ by using $SS_2$ and $\bar{x}_2$. Equation 418 may be used for decrementally calculating the component $covX^I_{(2,1)}$ (lag l=1) by using $\bar{x}_1$ and $covX_{(1,1)}$ (lag l=1) previously calculated for computation window 502 and $\bar{x}_2$. Equation 419 may be used for calculating the autocorrelation $\rho^I_{(2,1)}$ at lag l=1 by using $covX^I_{(2,1)}$ and $SX_2$. There are a total of 2 divisions, 7 multiplications, 3 additions, and 10 subtractions when decrementally calculating the autocorrelation at lag l=1 on a computation window of size 5.

The same equations may also be used for decrementally calculating the components of autocorrelation at lag l=1 for computation window 506 from the components of autocorrelation for computation window 504. The computation window size 507 is decreased to 4. Although the computation window size is changed, the number of operations performed by the decremental autocorrelation calculation algorithm remains constant. There are also a total of 2 divisions, 7 multiplications, 3 additions and 10 subtractions when decrementally calculating the components of autocorrelation and then calculating the autocorrelation on a computation window of size 4. As such, since the number of operations performed by the decremental autocorrelation calculation algorithm is fixed and not changing with the computation window size, starting from computation window 504, the number of operations used when decrementally calculating the autocorrelation is (potentially substantially) less than when using traditional equations for computation windows with a large size.

FIG. 5C illustrates an example of calculating autocorrelation using decremental algorithm 2. The example assumes a data element $x_r$ is removed from the left most position of the computation window, and a mean instead of a sum is used in the example. The calculations for computation window 502 use traditional equations to calculate the initial values of components $\bar{x}_1$, $SX_1$, and $covX_{(1,1)}$, and the autocorrelation of computation window 502 is then calculated by using those components. In practice, such calculation will not happen, because decremental autocorrelation calculation would start from a non-empty computation window where those components have already been calculated. Using traditional algorithms to calculate those components on this non-empty computation window here is only for the purpose of illustrating the decremental autocorrelation calculation algorithm. For example, equation 402 may be used for calculating component $\bar{x}_1$. Equation 423 may be used for calculating component $SX_1$. Equation 426 may be used for calculating components $covX_{(1,1)}$. The autocorrelation $\rho_{(1,1)}$ of computation window 502 (lag l=1) is then calculated by using those components through equation 403. There are a total of 2 divisions, 11 multiplications, 14 additions, and 16 subtractions when calculating the autocorrelation at lag l=1 on a computation window of size 6 without any optimization.

However, starting from computation window 504, the components of the autocorrelation at lag l=1 for the adjusted computation window (e.g., 504) may be decrementally calculated from the components of the autocorrelation for the previous computation window (e.g., 502). The computation window size 505 is decreased to 5. For example, equation 409 may be used for decrementally calculating the component $x_2$ by using $\bar{x}_1$ previously calculated for computation window 502. Equation 425 may be used for decrementally calculating the component $SX_2$ by using $SX_1$ and $\bar{x}_2$ Equation 428 may be used for decrementally calculating the component $covX^I_{(2,1)}$ (lag l=1) by using $\bar{x}_1$, $\bar{x}_2$ and $covX_{(1,1)}$. Equation 429 may then be used for calculating the autocorrelation $\rho^I_{(2,1)}$ (lag l=1) by using $covX^I_{(2,1)}$ and $SX_2$. There are a total of 2 divisions, 5 multiplications, 3 additions and 11 subtractions when calculating the autocorrelation at lag l=1.

The same equations may also be used for decrementally calculating the components of autocorrelation for computation window 506 from the components of autocorrelation for computation window 504. The computation window size 507 is decreased to 4. Although the computation window size is changed, the number of operations performed by the decremental autocorrelation calculation algorithm remains constant. There are also a total of 2 divisions, 5 multiplications, 3 additions, and 11 subtractions when decrementally calculating the autocorrelation at lag=1. As such, since the number of operations performed by the decremental autocorrelation calculation algorithm is fixed and not changing with the computation window size, starting from computation window 504, the number of operations used when decrementally calculating the autocorrelation is (potentially substantially) less than when using traditional equations for computation windows with a large size.

FIG. 5D illustrates an example of calculating an autocorrelation at lag l=1 using decremental algorithm 3. The example assumes a data element $x_r$ is removed from the left most position of the computation window, and a mean instead of a sum is used in the example. The calculations for computation window 502 use traditional equations to calculate the initial values of components $\bar{x}_1$, $SX_1$, and $covX_{(1,1)}$, and the autocorrelation of computation window 502 is then calculated by using those components. In practice, such calculation will not happen, because decremental autocorrelation calculation would start from a non-empty computation window where those components have already been calculated. Using traditional algorithms to calculate those components on this non-empty computation window here is only for the purpose of illustrating the decremental autocorrelation calculation algorithm. For example, equation 402 may be used for calculating $\bar{x}_1$. Equation 433 may be used for calculating $SX_1$. Equation 436 may be used for calculating $covX_{(1,1)}$. Equation 403 may then be used for calculating autocorrelation $\rho_{(1,1)}$ of computation window 502 (lag l=1) by using $covX_{(1,1)}$ and $SX_1$. There are a total of 2 divisions, 11 multiplications, 14 additions, and 16 subtractions when calculating the autocorrelation at lag l=1 on a computation window of size 6 without any optimization.

However, starting from window 504, the components of the autocorrelation at lag l=1 for the adjusted computation window (e.g., 504) may be decrementally calculated from the components of the autocorrelation for the previous computation window (e.g., 502). The computation window size 505 is decreased to 5. For example, equation 409 may be used for decrementally calculating the component $\bar{x}_2$ by using $\bar{x}_1$ previously calculated for computation window 502. Equation 435 may be used for decrementally calculating the component $SX_2$ by using $SX_1$, $\bar{x}_1$ and $\bar{x}_2$. Equation 438 may be used for decrementally calculating the component $covX^I_{(2,1)}$ by using $\bar{x}_1$, $\bar{x}_2$, and $covX^I_{(1,1)}$. Equation 439 may then be used for calculating autocorrelation $\rho^I_{(2,1)}$ (lag l=1) by using $covX^I_{(2,1)}$ and $SX_2$. There are a total of 2 divisions, 6 multiplications, 3 additions, and 12 subtractions when calculating the autocorrelation at lag=1.

The same equations may also be used for decrementally calculating the components of autocorrelation for computation window 506 from the components of autocorrelation for computation window 504. The computation window size 507 is decreased to 4. Although the computation window size is changed, the number of operations performed by the decremental autocorrelation calculation algorithm remains constant. There are also a total of 2 divisions, 6 multiplications, 3 additions and 12 subtractions when decrementally calculating the autocorrelation at lag=1. As such, since the number of operations performed by the decremental autocorrelation calculation algorithm is fixed and not changing with the computation window size, starting from computation window 504, the number of operations used when decrementally calculating the autocorrelation is (potentially substantially) less than when using traditional equations for computation windows with a large size.

In the three examples above, a mean is used for the decremental autocorrelation calculation. If a sum instead of a mean is used, autocorrelation may also be decrementally calculated though the numbers of operations are different. Also, a data element $x_r$ is removed from the left most position of the computation window in the three examples above. It works in a similar way when the data element $x_r$ is removed from the right most position of the computation window but just use a few different equations.

FIG. 6 illustrates computational loads for traditional autocorrelation algorithm and decremental autocorrelation algorithms at lag l=1 for n=4 for computation window 505. As depicted, the computation loads are roughly at same level for traditional autocorrelation algorithms and decremental autocorrelation algorithms for computation windows of size 4.

FIG. 7 illustrates computational loads for traditional autocorrelation algorithm and decremental autocorrelation algorithm (when lag=1) for n=1,000,000 for any computation window other than the first computation window. As depicted, there are fewer multiplication operations, fewer addition operations, and fewer subtraction operations using any one of the decremental algorithms.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computing system comprising one or more computing devices and one or more storage media, each of the one or more computing devices comprising one or more processors, a computing-system-implemented method for generating an autocorrelation for data elements in an adjusted computation window, the method comprising:

initializing, by the computing-device-based computing system, a lag l (l>0), a computation window size n (n>2*l+1), a sum or a mean or both, and one or more other components of an autocorrelation at lag l for a computation window with size n of a buffer on at least one of the one or more storage media;

accessing or receiving, by the computing-device-based computing system, a data element or information about a data element to be removed from the computation window;

removing, by the computing-device-based computing system, the to-be-removed data element from the buffer;

adjusting, by the computing-device-based computing system, the computation window by:
  removing the to-be-removed data element from the computation window; and
  adjusting the computation window size;

decrementally deriving, by the computing-device-based computing system, a sum or a mean or both for the adjusted computation window;

directly decrementally deriving, by the computing-device-based computing system and based at least in part on the one or more components of the autocorrelation at lag l other than a sum and a mean for the computation window, one or more components of an autocorrelation at lag l other than a sum and a mean for the adjusted computation window, including:
accessing l data elements from each side of the adjusted computation window respectively and the removed data element whereby not all data elements in the adjusted computation window are accessed to reduce data access latency thereby saving computing resources and reducing the computing system's power consumption;
accessing each of the one or more components of the autocorrelation at lag l other than a sum and a mean for the computation window;
removing any contribution of the removed data element from each of the accessed components mathematically based on the removed data element and/or the l data elements from each side of the adjusted computation window wherein not all data elements in the adjusted computation window are used during the directly decrementally deriving the one or more components of the autocorrelation to reduce the number of operations performed by the computing system, thereby increasing calculation efficiency;
generating, by the computing-device-based computing system, an autocorrelation at lag l for the adjusted computation window based on one or more of the decrementally calculated components.

2. The computing-system-implemented method of claim 1, wherein the generating an autocorrelation further comprises indirectly decrementally deriving, by the computing-device-based computing system, one or more components of the autocorrelation at lag l for the adjusted computation window, wherein the indirectly decrementally deriving the one or more components includes individually calculating each respective one of the one or more components based on one or more components other than the respective one component.

3. The computing-system-implemented method of claim 1, wherein accessing or receiving a data element or information about a data element to be removed from the computation window includes accessing or receiving a plurality of z (z>1) data elements or information about a plurality of z (z>1) data elements to be removed from the computation window, and wherein the method further comprises performing, for each of the respective z data elements to be removed, the removing the to-be-removed data element from the buffer, the adjusting the computation window and the computation window size, the decrementally deriving a sum or a mean or both, the directly decrementally deriving the one or more components for the adjusted computation window, and the generating an autocorrelation at lag l for the adjusted computation window.

4. The computing system of claim 3, wherein the generating an autocorrelation at lag l for the adjusted computation window comprises generating an autocorrelation at lag l for the adjusted computation window only when the autocorrelation is accessed.

5. The computing-system-implemented method of claim 4, wherein the generating an autocorrelation at lag l for an adjusted computation window further comprises indirectly decrementally deriving, by the computing-device-based computing system, one or more components of the autocorrelation at lag l for the adjusted computation window, wherein the indirectly decrementally deriving one or more components includes individually calculating each respective one of the one or more components based on one or more components other than the respective one component.

6. The computing-system-implemented method of claim 1, wherein accessing or receiving a data element or information about a data element to be removed from the computation window includes accessing or receiving a plurality of z (z>1) data elements or information about a plurality of z (z>1) data elements to be removed from the computation window, and wherein the method further comprises performing, for each of the respective z data elements to be removed, the removing the to-be-removed data element from the buffer, the adjusting the computation window and the computation window size, the decrementally deriving a sum or a mean or both, and the directly decrementally deriving the one or more components for the adjusted computation window.

7. A computing system, the computing system comprising:
computing devices;
each of the computing devices comprising one or more processors;
one or more storage media;
a data buffer on at least one of the one or more storage media which contains streamed data elements;
a computation window size counter which indicates a quantity of data elements in a computation window of the data buffer; and
one or more calculation modules that, when executed by at least one of the one or more computing devices, determine an autocorrelation at a specified lag l for an adjusted computation window, wherein the determination of the autocorrelation includes to:
a. initialize a lag l (l>0), a computation window size counter n (n>2*l+1), a sum or a mean or both, and one or more other components of an autocorrelation at lag l for a computation window containing n data elements of the data buffer;
b. access or receive a data element or information about a data element to be removed from the computation window;
c. remove the to-be-removed data element from the data buffer;
d. adjust the computation window by removing the to-be-removed data element from the computation window and adjusting the computation window size counter;
e. decrementally calculate a sum or a mean or both for the adjusted computation window;
f. directly decrementally calculate one or more components of an autocorrelation at lag l other than a sum and a mean for the adjusted computation window based on the one or more components of the autocorrelation at lag l for the computation window, including:
accessing l data elements from each side of the adjusted computation window respectively whereby not all data elements in the adjusted computation window are accessed to reduce data access latency thereby saving computing resources and reducing the computing system's power consumption;
access the one or more components of the autocorrelation at lag l other than a sum and a mean for the computation window; and
remove any contribution of the removed data element from each of the accessed components mathematically based on the removed data element and/or the l data elements from each side of the adjusted computation window wherein not all data elements in the adjusted computation window are used during the directly decrementally calculating the one or more components of the autocorrelation to reduce the number of operations performed by the computing system, thereby increasing calculation efficiency; and g. generate an autocorrelation at lag l for the adjusted computation window based on one or more of the decrementally calculated components.

8. The computing system of claim 7, wherein the generating an autocorrelation at lag l further comprises indirectly decrementally calculate one or more components of the autocorrelation at lag l for the adjusted computation window, wherein the indirectly decrementally calculating the one or more components includes individually calculating each respective one of the one or more components based on one or more components other than the respective one component.

9. The computing system of claim 7, wherein the one or more calculation modules, when executed by at least one of the one or more computing devices, perform b, c, d, e, f, and g multiple times.

10. The computing system of claim 9, wherein the performing g comprises generating an autocorrelation at lag l for the adjusted computation window only when the autocorrelation is accessed.

11. The computing system of claim 10, wherein the generating an autocorrelation at lag l for an adjusted computation window comprises indirectly decrementally calculating one or more components of the autocorrelation at lag l for the adjusted computation window, wherein the indirectly decrementally calculating one or more components includes individually calculating each respective one of the one or more components based on one or more components other than the respective one component.

12. The computing system of claim 7, wherein the one or more calculation modules, when executed by at least one of the one or more computing devices, perform b, c, d, e, and f multiple times.

13. A computing system program product for use at a configured computing system that comprises one or more computing devices and one or more storage media, each of the computing devices comprising one or more processors, the computing system program product for implementing a method for generating an autocorrelation at a specified lag for data elements in an adjusted computation window, the computing system program product comprising one or more non-transitory computing-device-readable storage media having stored thereon computing-device-executable instructions that, when executed by at least one of the one or more computing devices in the configured computing system, cause the configured computing system to perform the method, including steps to:

initialize, by the configured computing system, a sum or a mean or both, and one or more other components of an autocorrelation at a specified lag l for a computation window with a specified size n (n>2*l+1) of a data buffer on at least one of the one or more storage media;

access or receive, by the configured computing system, a data element or information about a data element to be removed from the computation window;

remove the to-be-removed data element from the data buffer;

adjust, by the configured computing system, the computation window, via removing the to-be-removed data element from the computation window and adjusting the computation window size;

decrementally calculate, by the configured computing system, a sum or a mean or both for the adjusted computation window;

directly decrementally calculate, by the configured computing system and based at least in part on the one or more components of the autocorrelation at lag l calculated for the computation window, one or more components of an autocorrelation at lag l for the adjusted computation window, including:

access l data elements from each side of the adjusted computation window respectively whereby not all data elements in the adjusted computation window are accessed to reduce data access latency thereby saving computing resources and reducing the computing system's power consumption;

access the one or more components other than a sum and a mean for the computation window;

remove any contribution of the data element removed from the computation window from each of the accessed components mathematically wherein not all data elements in the adjusted computation window are used during the directly decrementally calculating the one or more components of the autocorrelation to reduce the number of operations performed by the computing system, thereby increasing calculation efficiency; and generate, by the configured computing system, an autocorrelation at lag l for the adjusted computation window based on one or more of the decrementally calculated components.

14. The computing system program product of claim 13, wherein the generating an autocorrelation at lag l for the adjusted computation window further comprises indirectly decrementally calculating, by the configured computing system, one or more components for the adjusted computation set, wherein the indirectly decrementally calculating the one or more components includes individually calculating each respective one of the one or more components based on one or more components other than the respective one component.

15. The computing system program product of claim 13, wherein the computing-device-executable instructions that, when executed, further cause the configured computing system to access or receive a data element or information about a data element to be removed, to remove the to-be-removed data element from the data buffer, to adjust the computation window and the computation window size, to decrementally calculate a sum or a mean or both for the adjusted computation window, to directly decrementally calculate the one or more components, and to generate an autocorrelation at lag l for the adjusted computation window for each of multiple data elements to be accessed or received.

16. The computing system program product of claim 15, wherein the generating an autocorrelation at lag l for the adjusted computation window comprises generating an autocorrelation at lag l for the adjusted computation window only when the autocorrelation is accessed.

17. The computing system program product of claim 16, wherein the generating an autocorrelation at lag l for the adjusted computation window comprises indirectly decrementally calculating one or more components of the autocorrelation at lag l for the adjusted computation window, wherein the indirectly decrementally calculating one or more components includes individually calculating each respective one of the one or more components based on one or more components other than the respective one component.

18. The computing system program product of claim 13, wherein the computing-device-executable instructions that, when executed, further cause the configured computing system to access or receive a data element or information about a data element to be removed, to remove the to-be-removed data element from the data buffer, to adjust the computation window and the computation window size, to decrementally calculate a sum or a mean or both for the adjusted computation window, and to directly decrementally calculate the one or more components for the adjusted computation window for each of multiple data elements to be accessed or received.

* * * * *